(12) United States Patent
Ronen et al.

(10) Patent No.: US 11,947,130 B2
(45) Date of Patent: Apr. 2, 2024

(54) OPTICAL DEVICES AND SYSTEMS WITH DICHROIC BEAMSPLITTER COLOR COMBINER

(71) Applicant: Lumus Ltd., Ness Ziona (IL)

(72) Inventors: Eitan Ronen, Rechovot (IL); Motke Gilo, Ness Ziona (IL)

(73) Assignee: Lumus Ltd., Ness Ziona (IL)

( * ) Notice: Subject to any disclaimer, the term of this patent is extended or adjusted under 35 U.S.C. 154(b) by 551 days.

(21) Appl. No.: 17/290,764

(22) PCT Filed: Nov. 7, 2019

(86) PCT No.: PCT/IB2019/059579
§ 371 (c)(1),
(2) Date: May 2, 2021

(87) PCT Pub. No.: WO2020/095245
PCT Pub. Date: May 14, 2020

(65) Prior Publication Data
US 2022/0004014 A1    Jan. 6, 2022

Related U.S. Application Data

(60) Provisional application No. 62/757,199, filed on Nov. 8, 2018.

(51) Int. Cl.
*G02B 27/28* (2006.01)
*G02B 27/12* (2006.01)
*G02B 27/14* (2006.01)

(52) U.S. Cl.
CPC ......... *G02B 27/283* (2013.01); *G02B 27/126* (2013.01); *G02B 27/141* (2013.01); *G02B 27/286* (2013.01)

(58) Field of Classification Search
None
See application file for complete search history.

(56) References Cited

U.S. PATENT DOCUMENTS 5,096,520 A    3/1992   Faris
5,852,693 A    12/1998  Jeong
(Continued)

FOREIGN PATENT DOCUMENTS

JP    2015099323    5/2015
WO   2021124315    6/2021

OTHER PUBLICATIONS

Lynch et al. "Beam Manipulation: Prisms vs. Mirrors". Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009).

*Primary Examiner* — Robert E. Tallman
(74) *Attorney, Agent, or Firm* — Rivka Friedman

(57) ABSTRACT

A first dichroic beamsplitter is deployed in a first prism on a plane oblique to a light-wave entrance surface. A second dichroic beamsplitter is deployed in a second prism on a plane oblique to a light-wave entrance surface such that polarized light in a first polarization state relative to the first dichroic beamsplitter is in a second polarization state relative to the second dichroic beamsplitter. The first dichroic beamsplitter transmits polarized light of a first color in the first polarization state relative to the first dichroic beamsplitter, and reflects polarized light of a second color in the first polarization state relative to the first dichroic beamsplitter. The second dichroic beamsplitter transmits polarized light of the first and second colors in a second polarization state relative to the second dichroic beamsplitter, and (Continued)

reflects polarized light of a third color in the first polarization state relative to the second dichroic beamsplitter.

19 Claims, 13 Drawing Sheets

(56) References Cited

U.S. PATENT DOCUMENTS

| | | |
|---|---|---|
| 5,905,837 A | 5/1999 | Wang et al. |
| 7,148,936 B1 | 12/2006 | Hirota et al. |
| 2002/0075454 A1 | 6/2002 | Hsiung |
| 2003/0165017 A1 | 9/2003 | Amitai |
| 2004/0032660 A1 | 2/2004 | Amital |
| 2004/0033528 A1 | 2/2004 | Amitai |
| 2005/0078388 A1 | 4/2005 | Amitai |
| 2005/0083592 A1 | 4/2005 | Amitai |
| 2005/0180687 A1 | 8/2005 | Amitai |
| 2007/0091445 A1 | 4/2007 | Amitai |
| 2007/0097513 A1 | 5/2007 | Amital |
| 2007/0155277 A1 | 7/2007 | Amitai |
| 2008/0025667 A1 | 1/2008 | Amitai |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171680 A1 | 7/2010 | Lapidot et al. |
| 2012/0006860 A1 | 3/2012 | Ide et al. |
| 2012/0179369 A1 | 6/2012 | Lapidot et al. |
| 2013/0002158 A1 | 1/2013 | Takahashi et al. |
| 2013/0229717 A1 | 9/2013 | Amitai |
| 2013/0276960 A1 | 10/2013 | Amitai |
| 2013/0279017 A1 | 10/2013 | Amitai |
| 2013/0335708 A1 | 12/2013 | Ouderkirk |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2015/0138451 A1 | 5/2015 | Amitai |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0277127 A1 | 10/2015 | Amitai |
| 2015/0288937 A1 | 10/2015 | Tsai et al. |
| 2015/0293360 A1 | 12/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0341964 A1 | 11/2016 | Amitai |
| 2016/0349518 A1 | 12/2016 | Amitai et al. |
| 2017/0045664 A1 | 2/2017 | Chung et al. |
| 2017/0045744 A1 | 2/2017 | Amitai |
| 2017/0052376 A1 | 2/2017 | Amitai |
| 2017/0052377 A1 | 2/2017 | Amitai |
| 2017/0242249 A1 | 8/2017 | Wall et al. |
| 2017/0336636 A1 | 11/2017 | Amitai et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292053 A1 | 10/2018 | Minor et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0043272 A1 | 2/2022 | Amitai |
| 2022/0057643 A1 | 2/2022 | Eisenfeld et al. |
| 2022/0043269 A1 | 10/2022 | Maziel |

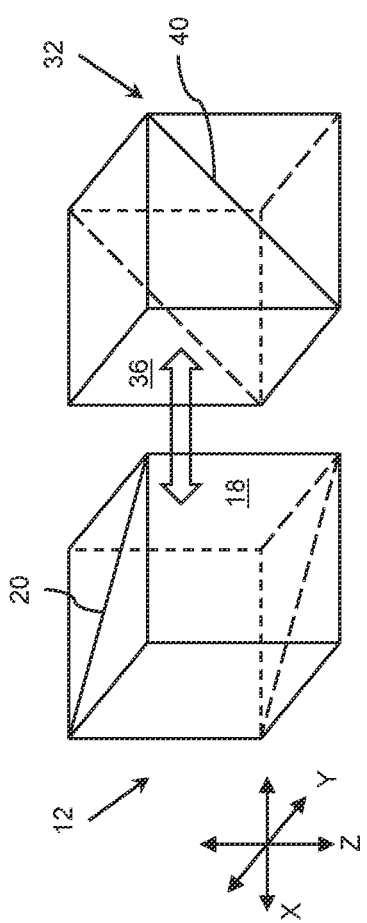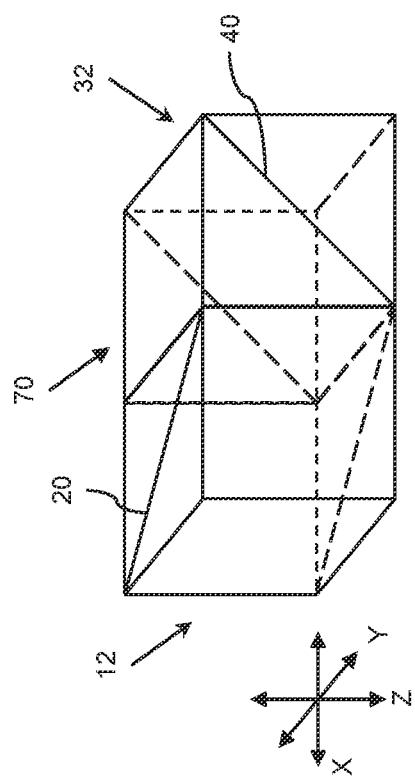

OPTICAL DEVICES AND SYSTEMS WITH DICHROIC BEAMSPLITTER COLOR COMBINER

CROSS-REFERENCE TO RELATED APPLICATIONS

This application claims priority from U.S. Provisional Patent Application No. 62/757,199, filed Nov. 8, 2018, whose disclosure is incorporated by reference in its entirety herein.

TECHNICAL FIELD

The present invention relates to optical devices and systems.

BACKGROUND OF THE INVENTION

Compact optical devices are particularly needed in the field of head-mounted displays (HMDs), wherein an optical module performs functions of image generation and collimation of the image to infinity, for delivery to the eye of the viewer. The image can be obtained from a display device, either directly from a spatial light modulator (SLM), such as a cathode ray tube (CRT), a liquid crystal display (LCD), a liquid crystal on silicon (LCoS), a digital micro-mirror device (DMD), an OLED display, a scanning source or similar devices, or indirectly, by means of a relay lens or an optical fiber bundle. The image, made up of an array of pixels, is focused to infinity by a collimating arrangement and transmitted into the eye of the viewer, typically by a reflecting surface or a partially reflecting surface acting as a combiner, for non-see-through applications and see-through applications, respectively. Typically, a conventional, free-space optical module is used for these purposes.

A particularly advantageous family of solutions for HMDs and near-eye displays (NEDs) are commercially available from Lumus Ltd. (Israel), typically employing light-guide substrates (waveguides) with partially reflecting surfaces or other applicable optical elements for delivering an image to the eye of a user.

In certain optical architectures utilizing SLMs as the display device, in particular those utilizing LCoS or LCDs to generate the image pixels, the active areas of the display device require illumination from a combined-colored beam made up of constituent colored beams originating from different colored illumination sources in order to generate the image pixels. Various optical architecture concepts for color combiners have been proposed. In one concept for combining light from three illumination sources, two dichroic mirrors are deployed, wherein each of the dichroic mirrors respectively transmits light of a certain color and reflects light another color. However, producing a combined color beam of high enough quality enable the SLM to project a good image is difficult to achieve when the light from the illumination sources is not collimated, which is typically the case in compact optical devices and systems such as those used in HMDs and NEDs.

In another concept for combining light from three illumination sources, the three illumination sources are deployed in a close-packed array, usually in a two-by-two matrix, in front of a light pipe that transmits the combined light. However, longer light pipes are needed in order to achieve color uniformity, which is problematic in compact optical devices and systems. Furthermore, the energy of the illumination sources must be limited due to thermal limitations arising from the close-packing, which places limitations on the brightness and intensity of the image generated by the SLM.

SUMMARY OF THE INVENTION

The present invention is an optical device having two dichroic beamsplitters deployed in respective prisms that cooperate to act as a color-combiner.

According to the teachings of an embodiment of the present invention, there is provided an optical device. The optical device comprises: a first prism including: a first light-wave entrance surface, a second light-wave entrance surface, and a light-wave exit surface, and a first dichroic beamsplitter configuration deployed within the first prism on a plane oblique to at least one of the light-wave entrance surfaces; and a second prism including: a first light-wave entrance surface, and a second light-wave entrance surface associated with the light-wave exit surface of the first prism, and a second dichroic beamsplitter configuration deployed within the second prism on a plane oblique to at least one of the light-wave entrance surfaces of the second prism and such that light in a first polarization state with regards to the first dichroic beamsplitter configuration is in a second polarization state with regards to the second dichroic beamsplitter configuration, the first dichroic beamsplitter configuration transmitting light at a wavelength of a first color, polarized in the first polarization state with regards to the first dichroic beamsplitter configuration, and reflecting light at a wavelength of a second color, polarized in the first polarization state with regards to the first dichroic beamsplitter configuration, and the second dichroic beamsplitter configuration transmitting light at a wavelength of the first color and light at a wavelength of the second color, polarized in the second polarization state with regards to the second dichroic beamsplitter configuration, and reflecting light at a wavelength of a third color, polarized in the first polarization state with regards to the second dichroic beamsplitter configuration.

Optionally, the optical device further comprises: a first source of polarized light associated with the first light-wave entrance surface of the first prism that produces light of the first color in the first polarization state with regards to the first dichroic beamsplitter configuration; a second source of polarized light associated with the second light-wave entrance surface of the first prism that produces light of the second color in the first polarization state with regards to the first dichroic beamsplitter configuration; and a third source of polarized light associated with the first light-wave entrance surface of the second prism that produces light of the third color in the first polarization state with regards to the second dichroic beamsplitter configuration.

Optionally, light produced by the first and second sources of polarized light reaches a light-wave exit surface of the second prism in the second polarization state with regards to the second dichroic beamsplitter configuration, and light produced by the third source of polarized light reaches the light-wave exit surface of the second prism in the first polarization state with regards to the second dichroic beamsplitter configuration.

Optionally, light produced by the first and second sources of polarized light, and light produced by the third source of polarized light, enter the first and second prisms, respectively, as uncollimated light.

Optionally, the first source of polarized light configured to produce red light that is s-polarized with regards to the first dichroic beamsplitter configuration, and the second source of polarized light configured to produce blue light that is s-polarized with regards to the first dichroic beamsplitter configuration, and the third source of polarized light configured to produce green light that is s-polarized with regards to the second dichroic beamsplitter configuration.

Optionally, the first source of polarized light configured to produce red light that is s-polarized with regards to the first dichroic beamsplitter configuration, and the second source of polarized light configured to produce green light that is s-polarized with regards to the first dichroic beamsplitter configuration, and the third source of polarized light configured to produce blue light that is s-polarized with regards to the second dichroic beamsplitter configuration.

Optionally, the first source of polarized light configured to produce green light that is s-polarized with regards to the first dichroic beamsplitter configuration, and the second source of polarized light configured to produce blue light that is s-polarized with regards to the first dichroic beamsplitter configuration, and the third source of polarized light configured to produce red light that is s-polarized with regards to the second dichroic beamsplitter configuration.

Optionally, the sources of polarized light include light-emitting diodes.

Optionally, the sources of polarized light include lasers.

Optionally, the optical device further comprises: a chromatic retarder associated with a light-wave exit surface of the second prism, the chromatic retarder oriented so as to change a polarization state of light from the first and second sources of polarized light from the second polarization state to the first polarization state with regards to the second dichroic beamsplitter configuration.

Optionally, the optical device further comprises: a reflective-display device that produces polarized light in response to being illuminated by light output from a light-wave exit surface of the second prism.

Optionally, the optical device further comprises: a light-guiding substrate having at least two major surfaces parallel to each other, light produced by the reflective display device coupled into the light-guiding substrate.

Optionally, the reflective-display device includes a liquid-crystal-on-silicon display.

Optionally, the first polarization state with regards to the first dichroic beamsplitter configuration is s-polarization.

Optionally, the light-wave entrance surfaces of the first prism are orthogonal to each other.

Optionally, the light-wave entrance surfaces of the second prism are orthogonal to each other.

Optionally, the second prism further includes a light-wave exit surface parallel to the light-wave exit surface of the first prism.

Optionally, the first and second prisms are optically coupled to each other at the light-wave exit surface of the first prism and the second light-wave entrance surface of the second prism.

Optionally, the optical coupling includes optical cement.

Optionally, the optical coupling includes a mechanical arrangement.

Optionally, at least one of the first prism or the second prism is a square cuboid prism.

There is also provided according to an embodiment of the teachings of the present invention an optical device. The optical device comprises: a first prism including: first and second light-wave entrance surfaces, and a first dichroic beamsplitter configuration deployed within the first prism on a plane oblique to at least one of the light-wave entrance surfaces; a second prism including: a light-wave entrance surface, and a second dichroic beamsplitter configuration deployed within the second prism on a plane oblique to the first light-wave entrance surface of the second prism and such that light in a first polarization state with regards to the first dichroic beamsplitter configuration is in a second polarization state with regards to the second dichroic beamsplitter configuration; a first source of polarized light, associated with the first light-wave entrance surface of the first prism, that produces light of a first color in a first polarization state with regards to the first dichroic beamsplitter configuration; a second source of polarized light, associated with the second light-wave entrance surface of the first prism, that produces light of a second color in the first polarization state with regards to the first dichroic beamsplitter configuration; and a third source of polarized light, associated with the first light-wave entrance surface of the second prism, that produces light of a third color in the first polarization state with regards to the second dichroic beamsplitter configuration, light produced by the first source of polarized light is transmitted by the first dichroic beamsplitter configuration and transmitted by the second dichroic beamsplitter configuration, and light produced by the second source of polarized light is reflected by the first dichroic beamsplitter configuration and transmitted by the second dichroic beamsplitter configuration, and light produced by the third source of polarized light is reflected by the second dichroic beamsplitter configuration.

Optionally, light produced by the first and second sources of polarized light, and light produced by the third source of polarized light, enter the first and second prisms, respectively, as uncollimated light.

There is also provided according to an embodiment of the teachings of the present invention an optical device. The optical device comprises: a prism assembly including: a first external surface, a second external surface, and a third external surface, the first, second and third external surfaces are mutually orthogonal, and a first light-wave entrance surface formed on at least a portion of the first external surface, a second light-wave entrance surface formed on at least a portion of the second external surface, and a third light-wave entrance surface formed on at least a portion of the third external surface, and a first dichroic beamsplitter configuration deployed within a first portion of the prism assembly on a plane oblique to at least one of the first or second light-wave entrance surfaces, a second dichroic beamsplitter configuration deployed within a second portion of the prism assembly on a plane oblique to the third light-wave entrance surface such that light in a first polarization state with regards to the first dichroic beamsplitter configuration is in a second polarization state with regards to the second dichroic beamsplitter configuration; a first source of polarized light, associated with the first light-wave entrance surface, that produces light of a first color in a first polarization state with regards to the first dichroic beamsplitter configuration; a second source of polarized light, associated with the second light-wave entrance surface, that produces light of a second color in the first polarization state with regards to the first dichroic beamsplitter configuration; and a third source of polarized light, associated with the third light-wave entrance surface, that produces light of a third color in the first polarization state with regards to the first dichroic beamsplitter configuration, the first dichroic beamsplitter configuration configured to transmit light, at a wavelength of the first color, that is polarized in the first polarization state with regards to the first dichroic beamsplitter configuration, and reflect light, at a wavelength of the second color, that is polarized in the first polarization state with regards to the first dichroic beamsplitter configuration, and the second dichroic beamsplitter configuration configured to transmit light, at a wavelength of the first or second color, that is polarized in the second polarization state with regards to the second dichroic beamsplitter configuration, and reflect light, at a wavelength of the third color, that is polarized in the first polarization state with regards to the second dichroic beamsplitter configuration.

Optionally, light produced by the first, second and third sources of polarized light enters the prism assembly as uncollimated light.

There is also provided according to an embodiment of the teachings of the present invention an optical device. The optical device comprises: a first prism including: a first light-wave entrance surface, a second light-wave entrance surface, and a light-wave exit surface, and a first dichroic beamsplitter configuration deployed within the first prism on a plane oblique to at least one of the light-wave entrance surfaces; a second prism including: a first light-wave entrance surface, a second light-wave entrance surface, and a light-wave exit surface, and a second dichroic beamsplitter configuration deployed within the second prism on a plane oblique to at least one of the light-wave entrance surfaces of the second prism such that light in a first polarization state with regards to the first dichroic beamsplitter configuration is in a second polarization state with regards to the second dichroic beamsplitter configuration; a first source of polarized light that produces red light that is s-polarized with regards to the first dichroic beamsplitter configuration; a second source of polarized light that produces blue light that is s-polarized with regards to the first dichroic beamsplitter configuration; a third source of polarized light that produces green light that is s-polarized with regards to the first dichroic beamsplitter configuration, the first dichroic beamsplitter configuration transmitting the polarized red light and reflecting the polarized blue light so as to output polarized mixed light though the light-wave exit surface of the first prism, the polarized mixed light a mixture of the polarized red light and the polarized blue light, and the second dichroic beamsplitter configuration transmitting the polarized mixed light and reflecting the polarized green light so as to output mixed light though the light-wave exit surface of the second prism, the mixed light a mixture of the polarized red light, polarized blue light and polarized green light.

The terms "color combining" and "combined color(ed)" as used herein in the description can be used interchangeably with the terms "color mixing" and "mixed color(ed)", respectively, and "color multiplexing" and "multiplexed color(ed)", respectively.

As used herein, the terms "transmitting", "transmitted", "transmits", and variations thereof, used within the context of describing the wavelength-and-polarization-dependent transmission functionality performed by a dichroic beamsplitter configuration, for example "a dichroic beamsplitter configuration transmitting light", should generally be understood to mean that the dichroic beamsplitter configuration transmits a majority of wavelength-and-polarization-specific light incident to the surface of the dichroic beamsplitter configuration, and more preferably transmits at least 70% of wavelength-and-polarization specific light that is incident to the surface of the dichroic beamsplitter configuration, and most preferably transmits at least 80% of wavelength-and-polarization specific light that is incident to the surface of the dichroic beamsplitter configuration.

The terms "reflecting", "reflected", "reflects", and variations thereof, as used herein within the context of describing the wavelength-and-polarization-dependent reflection functionality performed by a dichroic beamsplitter configuration, for example "a dichroic beamsplitter configuration reflecting light", should generally be understood to mean that the dichroic beamsplitter configuration reflects a majority of wavelength-and-polarization-specific light incident to the surface of the dichroic beamsplitter configuration, and more preferably reflects at least 70% of wavelength-and-polarization specific light that is incident to the surface of the dichroic beamsplitter configuration, and most preferably reflects at least 80% of wavelength-and-polarization specific light that is incident to the surface of the dichroic beamsplitter configuration.

As used herein, the term "light-guide" refers to any light-waves transmitting body, preferably light-waves transmitting solid bodies, which may also be referred to as "optical substrates".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention.

In this regard, the description taken with the drawings makes apparent to those skilled in the art how embodiments of the invention may be practiced.

Attention is now directed to the drawings, where like reference numerals or characters indicate corresponding or like components. In the drawings:

FIG. 1 is a schematic isometric view of an optical device having two dichroic beamsplitters deployed in respective prisms to provide a color combiner, constructed and operative according to an embodiment of the present invention;

FIG. 2 is an exploded plan view of the optical device of FIG. 1, modified to show light sources;

FIG. 3 is a plan view of the optical device of FIG. 2 after assembly of the various components into a unitary structure;

FIG. 4 is an exploded front view of the optical device of FIG. 2;

FIG. 5 is a front view of the optical device of FIG. 4 after assembly of the various components into a unitary structure;

FIG. 6 is a schematic exploded plan view to show details of a first prism of the optical device of FIGS. 2 and 3;

FIG. 7 is a schematic exploded front view to show details of a second prism of the optical device of FIGS. 4 and 5;

FIGS. 8A and 8B are schematic isometric views showing the two prisms of the optical device of FIG. 1 separated from each other, and optically attached, respectively;

FIG. 9 is a representation of the orientation of a chromatic retarder of the optical device of FIG. 1;

FIG. 10 illustrates reflectance curves as a function of wavelength for s-polarization for a possible designed dichroic coating for a second dichroic beamsplitter of the optical device of FIG. 1;

FIG. 11 illustrates reflectance curves as a function of wavelength for p-polarization of a possible designed dichroic coating for the second dichroic beamsplitter;

Figure 1:
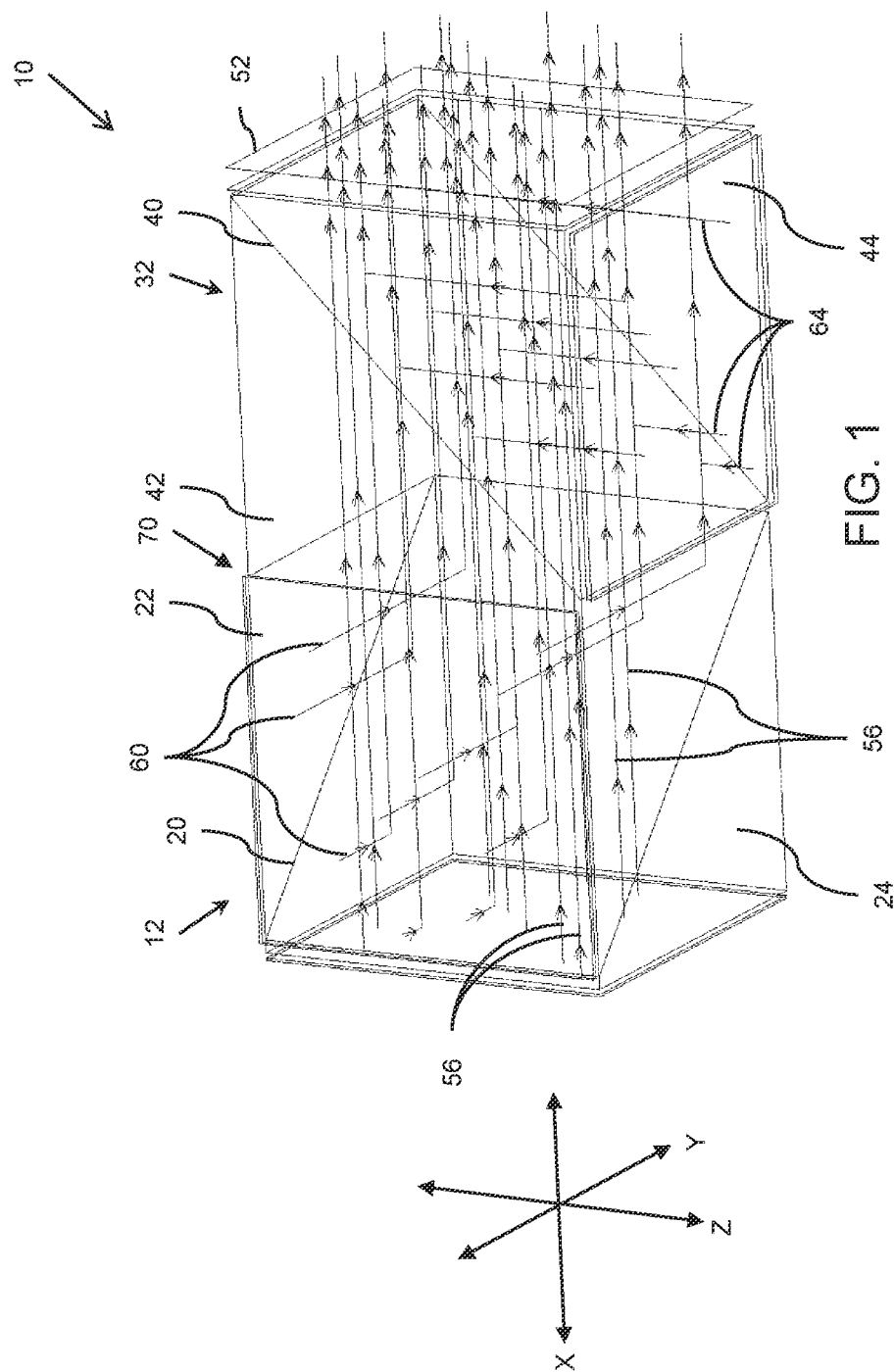
Figure 11:
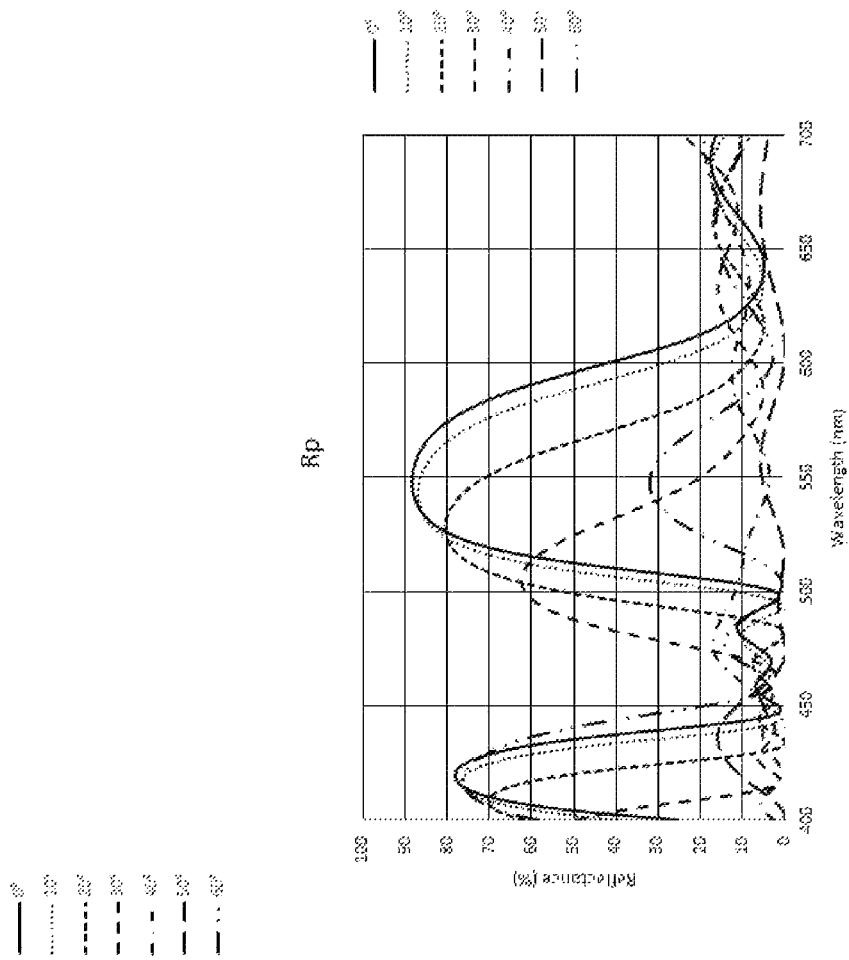
Figure 12:
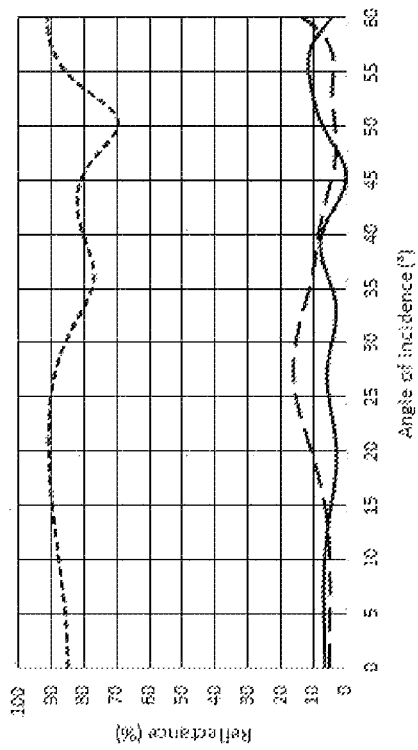
Figure 13:
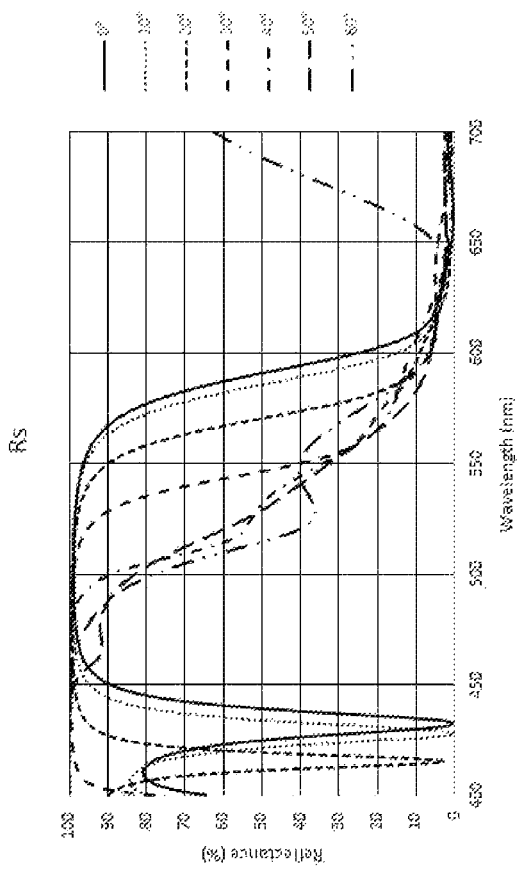
Figure 15:
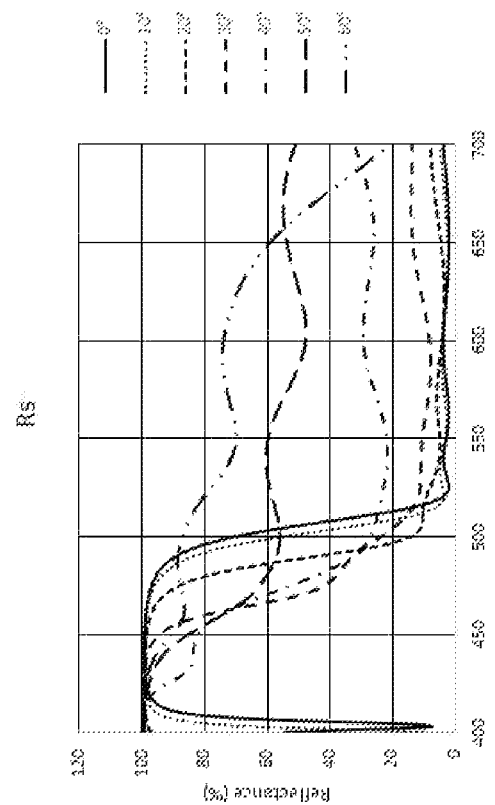
Figure 14:
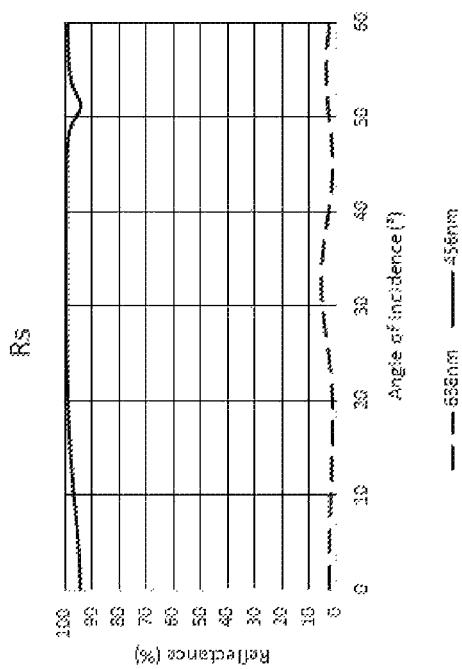
Figure 17:
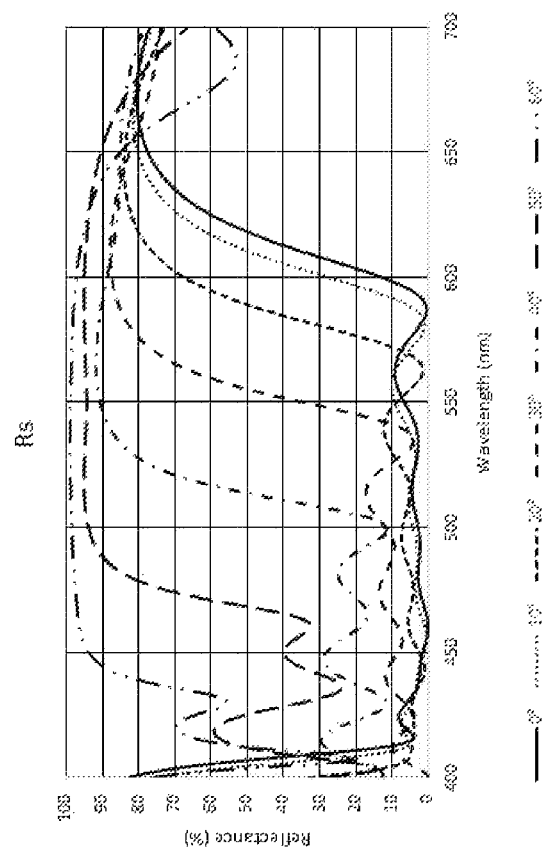
Figure 16:
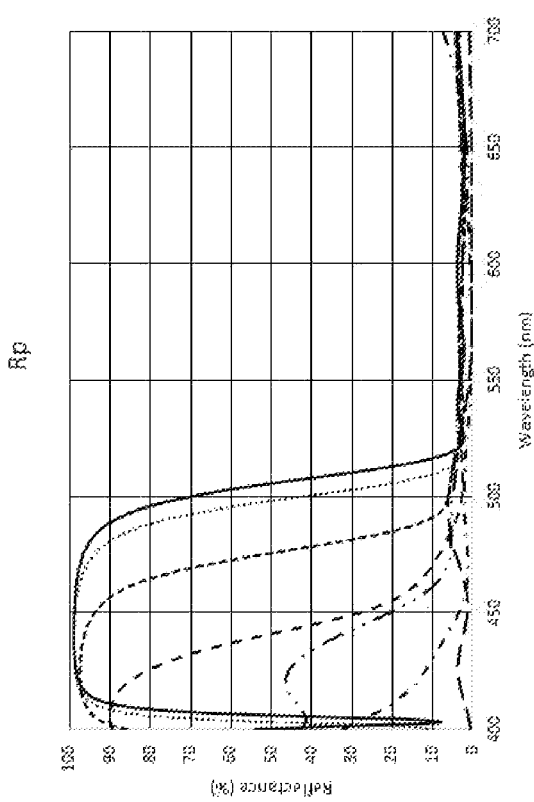
Figure 18:
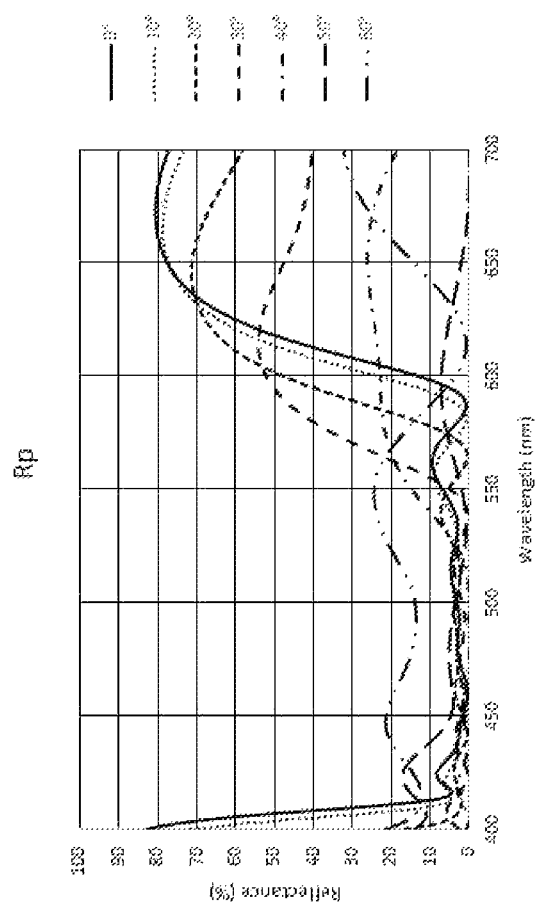
Figure 19:
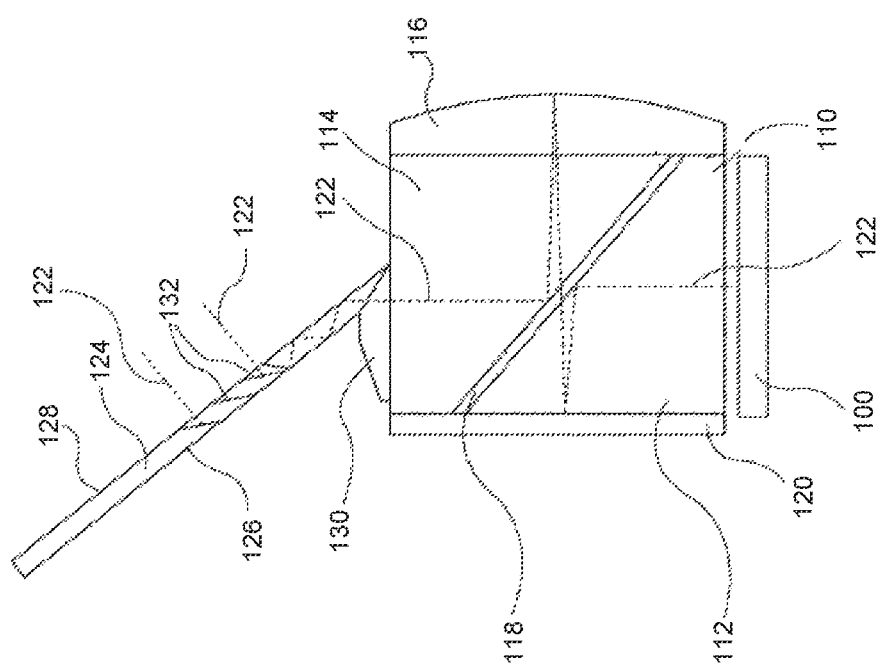

FIG. 12 illustrates reflectance curves as a function of incident angle, for three particular wavelengths, for the designed dichroic coating of FIG. 11;

FIG. 13 illustrates reflectance curves as a function of wavelength for s-polarization of a possible designed dichroic coating for a first dichroic beamsplitter of the optical device of FIG. 1;

FIG. 14 illustrates reflectance curves as a function of incident angle for the designed dichroic coating of FIG. 13;

FIG. 15 illustrates reflectance curves as a function of wavelength for s-polarization of a possible designed dichroic coating for a second dichroic beamsplitter of an optical device similar to the optical device of FIG. 1, but with a different ordering of light sources that inject light into the prisms;

FIG. 16 illustrates reflectance curves as a function of wavelength for p-polarization of a possible designed dichroic coating for the second dichroic beamsplitter of the optical device discussed with reference to FIG. 15;

FIG. 17 illustrates reflectance curves as a function of wavelength for s-polarization of a possible designed dichroic coating for a second dichroic beamsplitter of an optical device similar to the optical device of FIG. 1 and the optical device discussed with reference to FIG. 15, but with a different ordering of light sources that inject light into the prisms;

FIG. 18 illustrates reflectance curves as a function of wavelength for p-polarization of a possible designed dichroic coating for the second dichroic beamsplitter of the optical device discussed with reference to FIG. 17; and FIG. 19 is a schematic plan view of an optical system including the optical device of FIGS. 1-7 coupled to an image projector device and a light-waves transmitting substrate, according to an embodiment of the present invention.

DESCRIPTION OF THE PREFERRED EMBODIMENTS

The present invention is an optical device having two dichroic beamsplitters deployed in respective prisms that cooperate to combine three separate colored light beams to form a single combined-colored beam.

The principles and operation of the optical devices and systems according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, left and right, front and back (or rear), top and bottom, upper and lower, and the like. These directional references are exemplary only to illustrate the invention and embodiments thereof.

Referring now to the drawings, FIGS. 1-7 illustrate various views of an optical device, generally designated 10, and corresponding components thereof, constructed and operative according to various aspects of the present disclosure. In general terms, the optical device 10 includes a first prism 12 and a second prism 32, each formed from a light-wave transmitting material, and each having a respective dichroic beamsplitter configuration 20, 40 deployed therein, which cooperate to provide color combining functionality.

The first prism 12 has a number of planar external surfaces, including a first light-wave entrance surface 14, a second light-wave entrance surface 16, and a light-wave exit surface 18. A dichroic beamsplitter configuration 20 (which may be referred to in short as "DBS 20") is deployed within the first prism 12 on a plane that is oblique to the first light-wave entrance surface 14. In preferred implementations, this plane is also oblique to the second light-wave transmitting surface 16. In order to more clearly explain the orientations of the components of the optical device 10, an arbitrarily labeled Cartesian coordinate system (i.e., XYZ coordinate system) is included in the drawings (where appropriate). In this arbitrarily labeled XYZ coordinate system, when looking at FIG. 1, the y-axis is the axis generally coming out the plane of the paper.

Bearing this in mind, the first light-wave entrance surface 14 is in the YZ plane, and the DBS 20 is deployed on a plane that is oblique to the YZ plane. In preferred implementations, the DBS 20 is deployed on a plane that is 45-degrees to the first light-wave entrance surface 14, such that the DBS 20 lies in a plane that is halfway between the light-wave entrance surfaces 14, 16 (e.g., halfway between the YZ plane and XZ plane).

The first prism 12 may also include additional external surfaces, including a first surface 26 that is parallel to, and opposite from, the second light-wave entrance surface 16, a second surface 28 that is orthogonal to the surfaces 14, 16, 18, 26, and a third surface 30 that is parallel to, and opposite from, the second surface 28. In the non-limiting arbitrary directional reference frame depicted in the drawings, the various surfaces 14, 16, 18, 26, 28, 30 of the first prism 12 may be alternatively referred to in the following directional terms: left surface 14, back (or rear) surface 16, right surface 18, front surface 26, upper (or top) surface 28, and lower (or bottom) surface 30.

The second prism 32 has a number of planar external surfaces, including a first light-wave entrance surface 34, a second light-wave entrance surface 36, and a light-wave exit surface 38. A dichroic beamsplitter configuration 40 (which may be referred to in short as "DBS 40") is deployed within the second prism 32 on a plane that is oblique to the first light-wave entrance surface 34. In preferred implementations, this plane is also oblique to the second light-wave transmitting surface 36. In the arbitrarily labeled XYZ coordinate system in FIG. 1, the first light-wave entrance surface 34 is in the XY plane, and the DBS 40 is deployed on a plane that is oblique to the XY plane. In preferred implementations, the DBS 40 is deployed on a plane that is 45-degrees to the first light-wave entrance surface 34, such that the DBS 40 lies in a plane that is halfway between the light-wave entrance surfaces 34, 36 (e.g., halfway between the XY plane and YZ plane).

The second prism 32 may also include additional planar external surfaces, including a first surface 46 that is parallel to, and opposite from, the first light-wave entrance surface 34, a second surface 48 that is orthogonal to the surfaces 34, 36, 38, 46, and a third surface 50 that is parallel to, and opposite from, the second surface 48. In the non-limiting arbitrary directional reference frame depicted in the drawings, the various surfaces 34, 36, 38, 46, 48, 50 of the second prism 32 may be alternatively referred to in the following directional terms: lower (or bottom) surface 34, left surface 36, right surface 38, upper (or top) surface 46, back (or rear) surface 48, and front surface 50.

When fully assembled as a unitary optical structure to form the optical device 10, the surfaces 18, 36 of the two prisms 12, 32 are parallel and aligned with each other, and in preferred but non-limiting implementations are substantially coincident such that the surfaces 18, 36 form a single effective surface that doubly acts as the light-wave exit surface of the first prism 12 and the second light-wave entrance surface of the second prism 32. In a preferred implementation, the two prisms 12, 32 are attached to each other at the surfaces 18, 36 to form a unitary prism assembly 70. FIGS. 8A and 8B show the prisms 12, 32 separated from each other prior to attachment, and after attachment to form the unitary prism assembly 70, respectively. The attachment may be implemented via various optical attachment means, including, but not limited to, optically cementing the surfaces 18, 36 to each other, and a mechanical holding arrangement configured to fixedly hold the two prisms 12, 32 in place such that a direct (or indirect, via air gap) abutment is formed between the surfaces 18, 36.

The first prism 12 is based on (i.e., formed from) two prisms, labeled 22 and 24 in FIGS. 1-3 and 6), where at least one of the prisms 22, 24 (prism 24 in FIG. 6) is provided on the hypotenuse side with a dichroic coating to form a dichroic beamsplitter forming at least part of the DBS 20, which transmits s-polarized light in certain wavelengths, and reflects s-polarized light in other wavelengths. The hypotenuse sides of the two prisms 22, 24 are cemented to each other, to form a cemented prism assembly that forms the prism 12.

The second prism 32 is similarly based on two prisms, labeled 42 and 44 in FIGS. 1, 4, 5 and 7, where at least one of the prisms 42, 44 (prism 44 in FIG. 7) is provided on the hypotenuse side with a dichroic coating to form a dichroic beamsplitter forming at least part of the DBS 40, which transmits p-polarized light in certain wavelengths and reflects s-polarized light in other wavelengths. The hypotenuse sides of the two prisms 42, 44 are cemented to each other, to form a cemented prism assembly that forms the prism 32.

The dichroic coatings that are used to form the DBS 20 and the DBS 40 exhibit wavelength (i.e., color) and polarization sensitive properties, such that the DBS 20 and the DBS 40 reflect or transmit light that is incident to the surface of the DBS according to both the wavelength and polarization state of the incident light. The designs of the dichroic coatings that form the DBS 20 and the DBS 40 will be discussed in subsequent sections of the present disclosure.

Within the context of this document, dichroic coating can be provided on the hypotenuse side of at least one of the prisms 22, 24 and 42, 44 in various ways. In one non-limiting example, the dichroic coating can be applied directly on the hypotenuse side of one or both of the two constituent prisms. In another non-limiting example, a thin piece of material, such as, for example, a sheet, foil, or glass plate, that preferably extends along the entirety of the hypotenuse sides of the two constituent prisms and has a dichroic coating deposited thereon, can be deployed between the hypotenuse sides of the two constituent prisms prior to cementing.

The DBS 20 and the DBS 40 are oriented relative to each other such that light in a first polarization state (s-polarized or p-polarized) with regards (i.e., relative) to the surface of the DBS 20 and the surfaces 14, 16, 18 is in a second polarization state (p-polarized or s-polarized) with regards (i.e., relative) to the surface of the DBS 40 and the surfaces 34, 36, 38. The relative orientation between the DBS 20 and the DBS 40 is provided by rotationally offsetting the DBS 20 and the DBS 40 from each other about two primary orthogonal axes, which in the arbitrarily labeled XYZ coordinate system are the x-axis and z-axis. In the preferred implementation in which the DBS 20 is deployed on a plane that is at a 45-degree angle to the YZ plane and the DBS 40 is deployed on a plane that is at a 45-degree angle to the XY plane, the DBS 20 and the DBS 40 are rotationally offset from each other by 45-degrees about the x-axis and 45-degrees about the z-axis.

The following paragraphs describe the geometric configurations of the prisms 12, 32. In a preferred implementation, the light-wave entrance surfaces 14, 16 of the first prism 12 are orthogonal to each other, and the first light-wave entrance surface 14 and the light-wave exit surface 18 of the first prism 12 are parallel to each other. In such a preferred implementation, the light-wave entrance surfaces 34, 36 of the second prism 32 are also orthogonal to each other, and the first light-wave entrance surface 34 and the light-wave exit surface 38 of the second prism 32 are parallel to each other. In a particularly preferred implementation, each of the prisms 12, 32 is implemented as a square cuboid prism, where each of the component prisms 22, 24, 42, 44 has a 45-degree right-angles cross-sectional shape.

In a preferred geometric configuration, the prisms 12, 32 are of identical geometric structure, and most preferably the prisms 12, 32 are both square cuboid prisms with the DBS 20 and the DBS 40 deployed in planes that are at angles of 45-degrees to the respective light-wave entrance surfaces 14, 34 that bisect the respective prisms 12, 32.

When implemented as square cuboid prisms, the prism assembly 70 formed by optically attaching the two prisms 12, 32 together at surfaces 18, 36, is formed as an elongated rectangular cuboid prism. In such a particularly preferred implementation, the surfaces 14, 16, 18, 26, 28, 30 of the first prism 12 are of equal size and with adjacent surfaces being orthogonal, and the surfaces 34, 36, 38, 46, 48, 50 of the second prism 32 are of equal size and with adjacent surfaces being orthogonal. Furthermore, in such a particular implementation, the following pairs of surfaces are coplanar (and preferably joined to form single contiguous planar surfaces): the second light-wave entrance surface 16 of the first prism 12 and the second surface 48 of the second prism 32, the first surface 26 of the first prism 12 and the third surface 50 of the second prism 32, the second surface 28 of the first prism 12 and the first surface 46 of the second prism 32, and the third surface 30 of the first prism 12 and the first light-wave entrance surface 34 of the second prism 32.

The prism assembly 70, similar to the constituent prisms 12, 32, includes a number of planar external surfaces, and in particular preferred but non-limiting implementations includes six planar external surfaces. The first light-wave entrance surface 14 serves as a first external surface of the prism assembly 70, which is also a first light-wave entrance surface of the prism assembly 70. The light-wave exit surface 38 serves as a fourth external surface of the prism assembly 70, which also serves as a light-wave exit surface of the prism assembly 70.

Four of the external surfaces of the prism assembly 70 are formed from the joining of pairs of surfaces of the prisms 12, 32 to form contiguous surfaces. A second external surface of the prism assembly 70 is formed from joining the second light-wave entrance surface 16 of the first prism 12 and the second surface 48 of the second prism 32. A portion of the second external surface of the prism assembly 70 (namely the portion formed from the second light-wave entrance surface 16 of the first prism 12) serves as a second light-wave entrance surface of the prism assembly 70. A third external surface of the prism assembly 70 is formed from joining the third surface 30 of the first prism 12 and the first light-wave entrance surface 34 of the second prism 32. A portion of the third external surface of the prism assembly 70 (namely the portion formed from the first light-wave entrance surface 34 of the second prism 32) serves as a third light-wave entrance surface of the prism assembly 70. The first, second, and third external surfaces of the prism assembly 70 are mutually orthogonal.

A fifth external surface of the prism assembly 70 is formed from joining the first surface 26 of the first prism 12 and the third surface 50 of the second prism 32. A sixth external surface of the prism assembly 70 is formed from joining the second surface 28 of the first prism 12 and the first surface 46 of the second prism 32.

With particular reference to FIGS. 2-5, the optical device 10 has three sources of polarized light. A first source of polarized light, shown herein as a first light source 54 with a first linear polarizer 55, is associated with the first light-wave entrance surface 14 of the first prism 12 (which in certain embodiments is also the first external surface of the prism assembly 70). The first source of polarized light is configured to produce (i.e., emit) polarized light having wavelength in a first particular wavelength range of the electromagnetic spectrum that corresponds to a first color (e.g., red). A second source of polarized light, shown herein as a second light source 58 (shown in phantom in FIGS. 4 and 5) with a second linear polarizer 59, is associated with the second light-wave entrance surface 16 of the first prism 12 (which in certain embodiments is also a portion of the second external surface of the prism assembly 70). The second source of polarized light is configured to produce polarized light having wavelength in a second particular wavelength range of the electromagnetic spectrum that corresponds to a second color (e.g., blue). A third source of polarized light, shown herein as a third light source 62 (shown in phantom in FIGS. 2 and 3) with a third linear polarizer 63, is associated with the first light-wave entrance surface 34 of the second prism 32 (which in certain embodiments is also the third external surface of the prism assembly 70). The third source of polarized light is configured to produce polarized light having wavelength in a third particular wavelength range of the electromagnetic spectrum that corresponds to a third color (e.g., green). The three particular wavelength ranges are non-overlapping wavelength ranges, such that the three sources of polarized light produce three distinct respective colors of light, for example, red, blue and green.

In a preferred but non-limiting implementation, the first source of polarized light is configured to produce polarized light centered at wavelength of 638 nanometers (nm)—or approximately 638 nm—to produce polarized red light, the second source of polarized light is configured to produce polarized light centered at wavelength of 456 nm—or approximately 456 nm—to produce polarized blue light, and the third source of polarized light is configured to produce polarized light centered at wavelength of 532 nm—or approximately 532 nm—to produce polarized green light.

Figure 2:
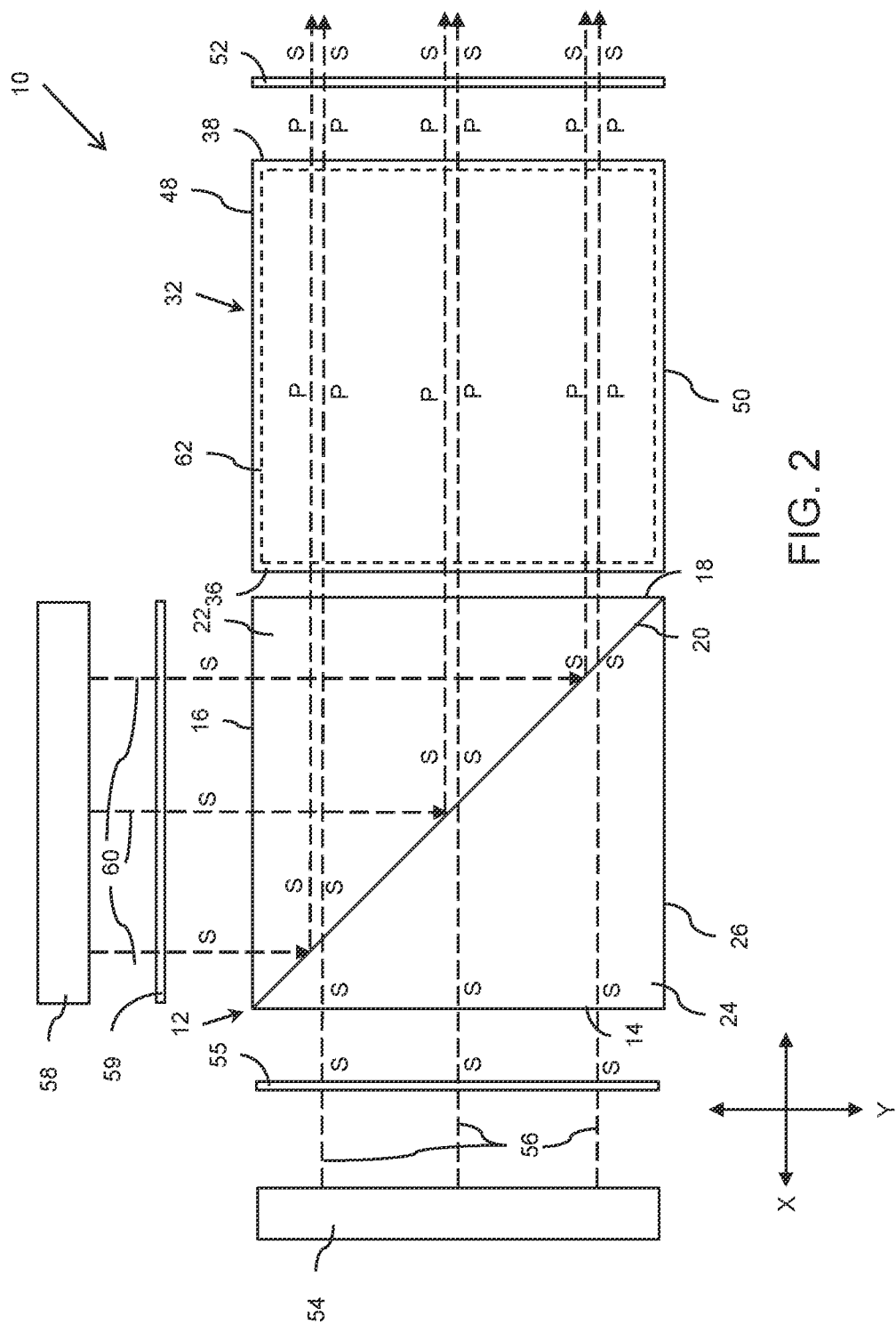
Figure 3:
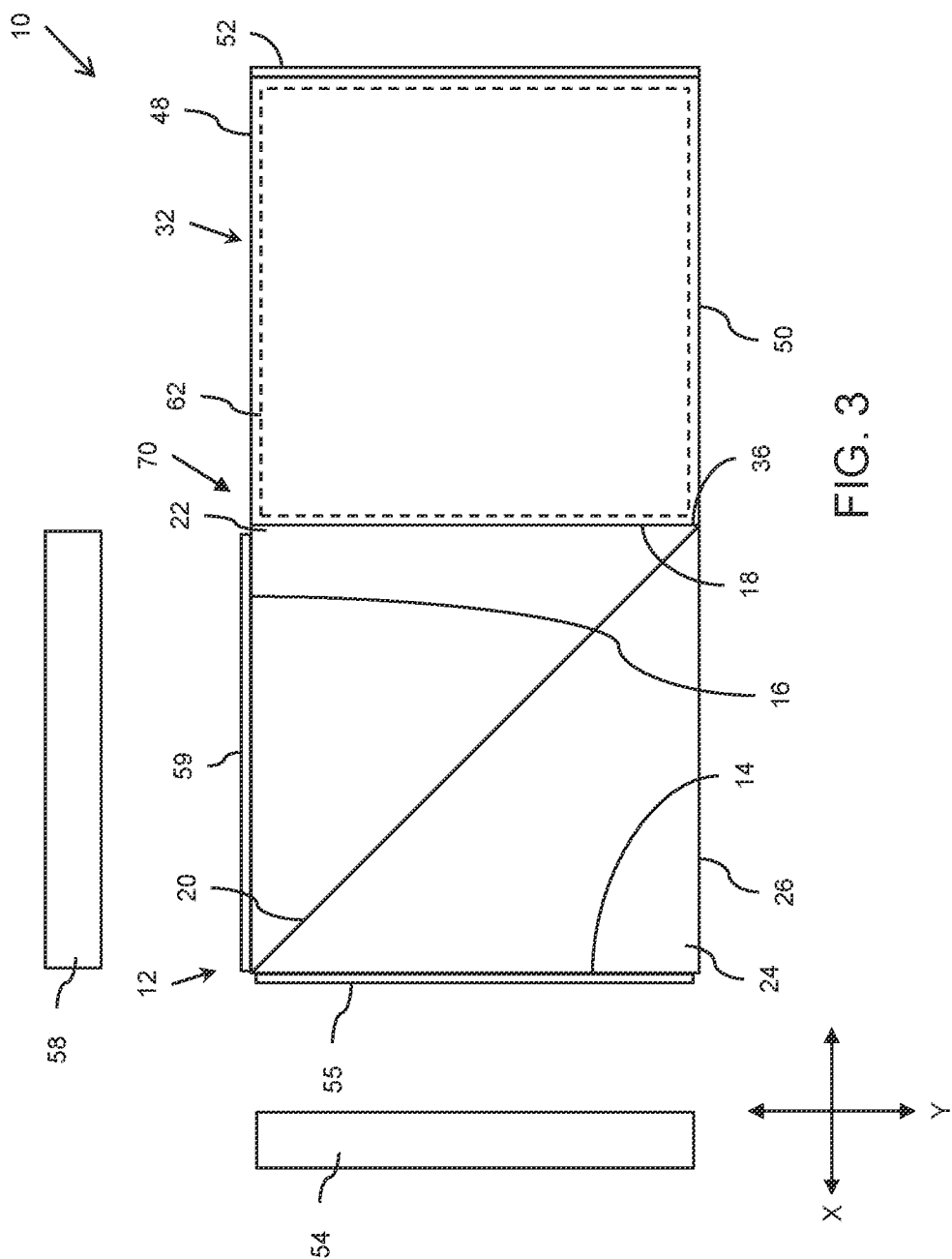
Figure 4:
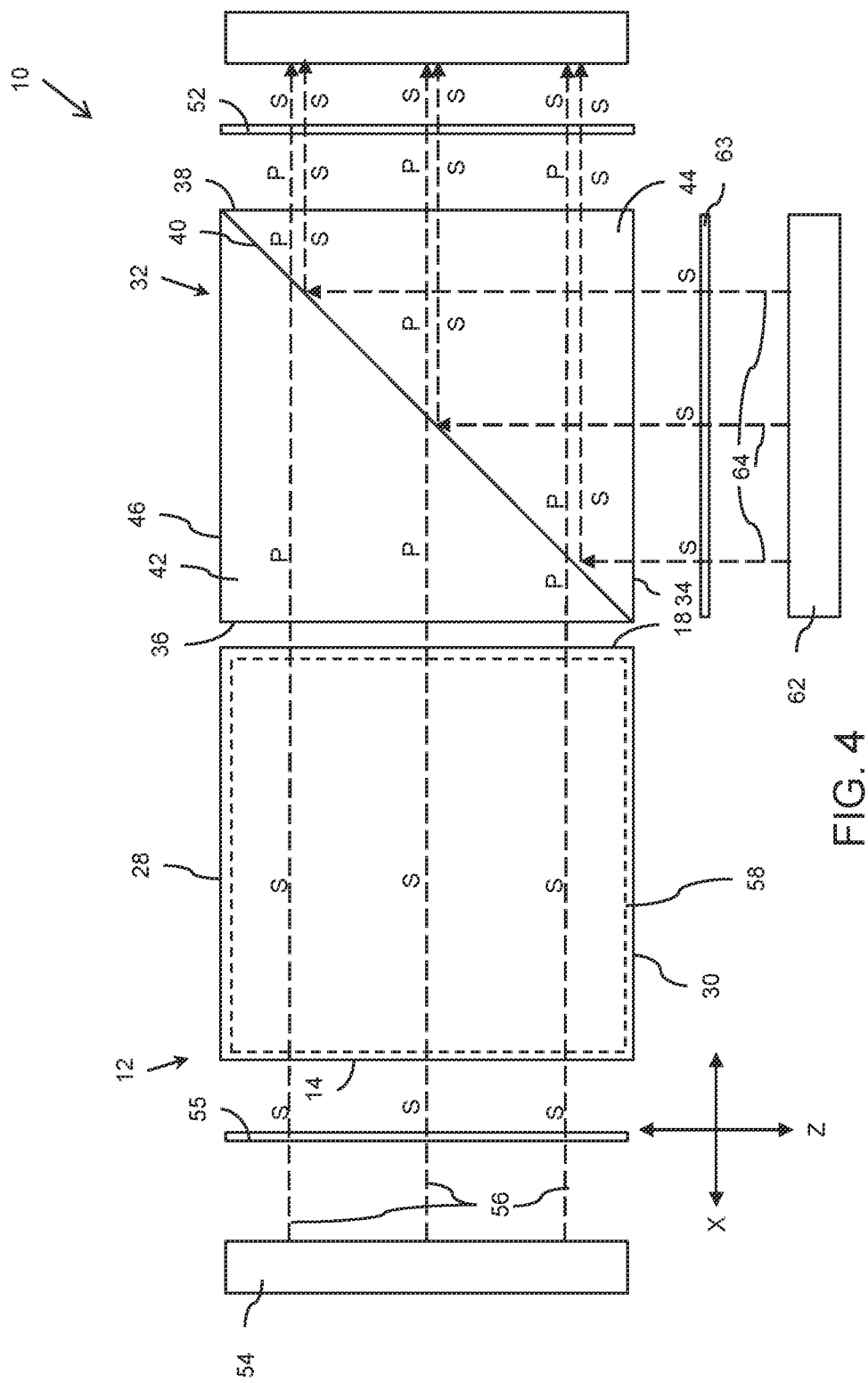
Figure 5:
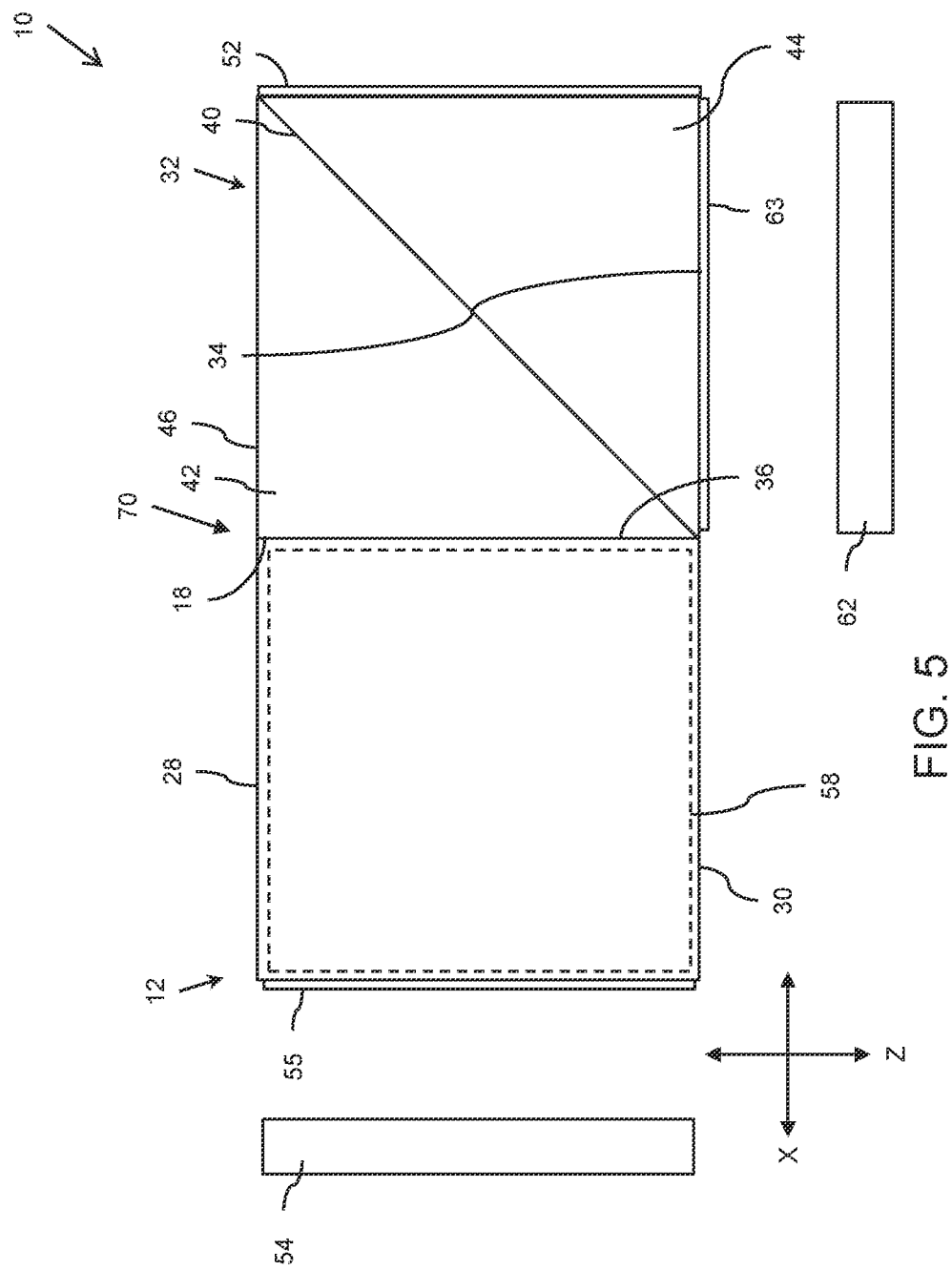
Figure 7:
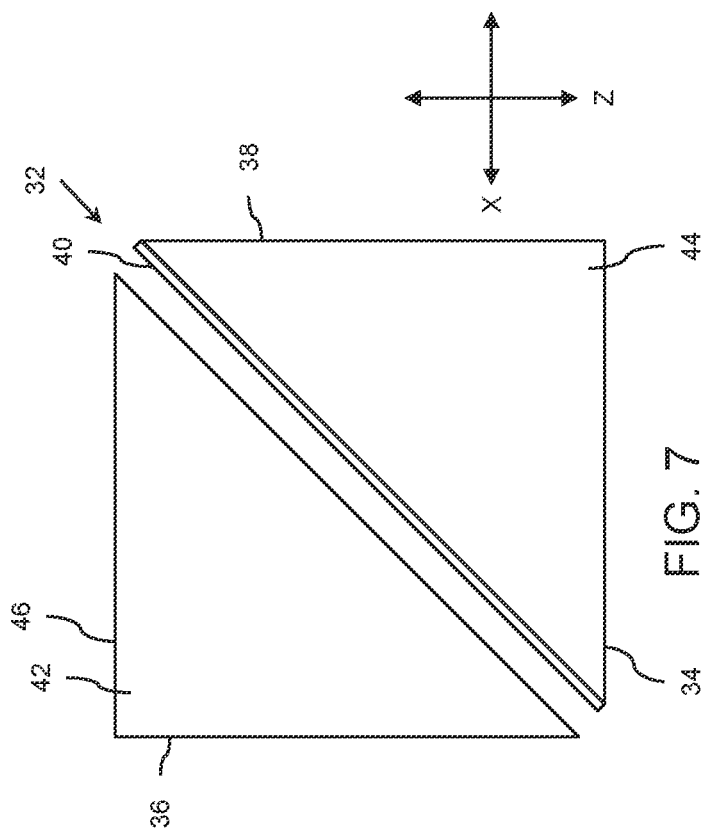

As shown in FIGS. 2 and 4, incident light beam 56 passes through the linear polarizer 55, incident light beam 60 passes through the linear polarizer 59, and incident light beam 64 passes through the linear polarizer 63. The light beams 56, 60, 64 can be from respective LEDs, lasers, laser diodes or any other respective light sources 54, 58, 62. Note that the linear polarizers 55, 59, 63 are not necessarily needed in a case where the light sources 54, 58, 62 themselves are polarized, although it may still be advantageous to ensure high quality of the polarized illumination. In a particularly preferred implementation, the incident light beams 56, 60 are s-polarized, with regards to the surface of the DBS 20, as illustrated in FIG. 2, and the incident light beam 64 is s-polarized with regards to the surface of the DBS 40, as illustrated in FIG. 4.

It is noted that the light sources 54, 58, 62 are preferably implemented as incoherent sources (e.g., LED, lasers, etc.) such that the incident light beams 56, 60, 64 produced by the sources of polarized light are diverging (or converging) beams that are coupled into the prism assembly 70 as uncollimated light. Furthermore, the sources of polarized light are configured to produce beams having a relatively wide beam angle, preferably in a range of ±25 degrees. Incident light from the sources of polarized light is refracted upon entering the prisms 12, 32. The beams propagating through the prisms 12, 32 have corresponding incident angles measured relative to the normal to the surface of the DBS encountered by the beam. As is known in the art, the angle of refraction of the beams (upon entering the prisms) is a function of the refractive index of the material from which the prisms are constructed. For example, when constructing the prisms 12, 32 from a material having a refractive index of 1.7, the incident beams from the sources of polarized light are refracted at angles in a range of approximately ±15 degrees, which corresponds to an angular range of approximately 30-60 degrees measured relative to the normal to the surface of the first DBS encountered by the incident beam (e.g., the first source of polarized light preferably has a beam angle that corresponds to incident angles in the range of 30-60 degrees with respect to the normal to the surface of the DBS 20). The wide beam angle at the input to the prism assembly 70 corresponds to a wide beam angle at the output of the optical device 10, which may be advantageous when the output beam is used to illuminate a reflective-display device, such as an LCoS.

It is further noted that the preferred geometric configuration of the prisms 12, 32 may promote uniformity across the range of incident angles at which incident light is reflected by the DBS 20 and the DBS 40. Nevertheless, other geometric configurations are contemplated, such as configurations in which one or both of the prisms 12, 32 is implemented as an elongated rectangular cuboid prism. However, such configurations may result in a reduced range of incident angles at which light is reflected by one or both of the DBS 20 and the DBS 40.

The following paragraphs describe the traversal of light from the three sources of polarized light through the prism assembly 70. As shown, the s-polarized input light waves from the first light source 54 (i.e., incident beam 56) are coupled into the prism 12 (which can be considered a "light-guide" optical device constructed from the prisms 22, 24 with the DBS 20 in between), which is composed of a light-waves transmitting material, through the first light-wave entrance surface 14. The s-polarized light waves (centered at wavelength of ~638 nm, i.e., s-polarized red light) are transmitted by the DBS 20 (due to the properties of the dichroic coating that forms the DBS 20), and are coupled-out of the prism 12 through the light-wave exit surface 18. Upon being coupled-out of the prism 12, the s-polarized light-waves are coupled into the prism 32 (which can be considered a "light-guide" optical device constructed from the prisms 42, 44 with the DBS 40 in between), which is composed of a light-waves transmitting material, through the second light-wave entrance surface 36. In implementations in which the prisms 12, 32 are attached at surfaces 18, 36 without an air gap, the coupling-out from the prism 12 and the coupling-in to the prism 32 are one in the same. The s-polarized light waves (from the incident beam 56) that are coupled into the prism 32 are now p-polarized with regards to the surface of the DBS 40 (as illustrated in FIG. 4), due to the relative orientation between the DBS 20 and the DBS 40. The now p-polarized light waves are transmitted by the DBS 40 (due to the properties of the dichroic coating that forms the DBS 40), and are coupled-out of the prism 32 through the light-wave exit surface 38. As a result, the s-polarized light waves (from the incident beam 56) traverse through both prisms 12, 32 of the prism assembly 70 without reflection.

The s-polarized input light waves from the second light source 58 (i.e., incident beam 60) are coupled into the prism 12, through the second light-wave entrance surface 16. The s-polarized light waves (centered at wavelength of ~456 nm, i.e., s-polarized blue light) are reflected by the DBS 20 (due to the properties of the dichroic coating that forms the DBS 20), and are coupled-out of the prism 12 through the light-wave exit surface 18. Upon being coupled-out of the prism 12, the s-polarized light-waves are coupled into the prism 32 through the second light-wave entrance surface 36. The s-polarized light waves (from the incident beam 60) that are coupled into the prism 32 are now p-polarized with regards to the surface of the DBS 40 (as illustrated in FIG. 4), due to the relative orientation between the DBS 20 and the DBS 40. The now p-polarized light waves are transmitted by the DBS 40 (due to the properties of the dichroic coating that forms the DBS 40), and are coupled-out of the prism 32 through the light-wave exit surface 38. As a result, the s-polarized light waves (from the incident beam 60) traverse through the prisms 12, 32 of the prism assembly 70 with a single reflection.

The s-polarized input light waves from the third light source 62 (i.e., incident beam 64) are coupled into the prism 32, through the first light-wave entrance surface 34. The s-polarized light waves (centered at wavelength of ~532 nm, i.e., s-polarized green light) are reflected by the DBS 40 (due to the properties of the dichroic coating that forms the DBS 40), and are coupled-out of the prism 32 through the light-wave exit surface 38. As a result, the s-polarized light waves (from the incident beam 64) traverse through only one of the prisms (prism 32) of the prism assembly 70, and with a single reflection, and without a change in polarization.

As shown in FIGS. 1, 2 and 4, and further to the discussion above, the dichroic coating that forms the DBS 20 enables the first prism 12 to mix together the light from the first and second sources of polarized light, and output the two-color mixed light through the light-wave exit surface 18. In the preferred but non-limiting implementation described herein, the mixed light at the output of the first prism 12 is a mixture of red and blue light (both being polarized in the same polarization state, e.g., s-polarized), produced by the first and second sources of polarized light, respectively. The DBS 40 enables the second prism 32 to mix together the light from third source of polarized light and the two-color mixed light output by first prism 12, and output the three-color mixed light through the light-wave exit surface 38. In the preferred but non-limiting implementation described herein, the three-color mixed light at the output of the second prism 32 is a mixture of the mixed red and blue light output by the first prism 12 (now p-polarized with regards to the surface of the DBS 40 and the light-wave exit surface 38) and the s-polarized green light produced by the third source of polarized light.

Parenthetically, for simplicity, only a small number (three) of light rays are used in the drawings to represent the incident beams 56, 60, 64 and their respective traversals through the prism assembly 70. As should be understood, the representative light rays shown in the drawings are only a small sample of the light rays that make up the incident beams, and that each of the incident beams is formed from multiple light rays, originating from the respective sources of polarized light.

At this stage, it will be appreciated that the present invention provides a particularly advantageous optical device. In particular, by employing three sources of polarized light that are associated with three mutually orthogonal light-wave entrance surfaces of the prism assembly 70, and that produce wide beams that are uncollimated before being coupled into the prism assembly 70, it is possible to achieve a compact optical device with high-energy wide-angled input beams, and a high-energy wide-angled color-mixed output beam (i.e., angles output by the light sources in a range of ±25 degrees, which in turn correspond to incident angles in the range of 30-60 degrees as previous mentioned) at the output (i.e., light-wave exit surface) of the prism assembly 70 (which is equivalently the light-wave exit surface 38 of the prism 32), which may be advantageous when implementing the optical device 10 as part of illumination components which are used to illuminate micro-displays of NED or HMD systems.

Various particularly preferred micro-displays exploit the fact that in some SLM micro-display sources, such as LCDs or LCoS displays, especially those used in HMDs and NEDs, the operation of the SLM is based on polarized light incident on the micro-display device, which is then reflected in at a different polarization state. One consequence of the compact configuration of the optical device 10 is that the mixed light at the output of the second prism 32 is made of constituent color light waves of different polarizations. Specifically, at the output of the second prism 32, the constituent color light waves corresponding to the third source of polarized light are polarized orthogonally to the constituent color light waves corresponding to the first and second sources of polarized light. In the example illustrated in FIGS. 2 and 4, the light waves at the output of the second prism 32, corresponding to the first and second sources of polarized light (i.e., the incident beams 56, 60), are p-polarized, whereas the light waves at the output of the second prism 32, corresponding to the third source of polarized light (i.e., the incident beam 64), are s-polarized. Since the above-mentioned micro-display devices are polarization sensitive, it is paramount to maintain polarization uniformity across all of the light incident to the micro-display device. Various embodiments described below disclose implementations in which elements are provide in order to maintain polarization uniformity of the light that is incident to the micro-display device.

With particular reference to FIGS. 1-5, a chromatic retarder 52 is deployed at the output of the prism assembly 70, and is associated with the light-wave exit surface 38 of the prism 32, such that all of the light waves from the three sources of polarized light (i.e., from the incident beams 56, 60, 64) that are coupled out of the second prism 32 pass through the chromatic retarder 52 after being coupled out of the prism 32 and before impinging on the micro-display device. The chromatic retarder 52 acts as a half-wave plate for light in certain wavelengths, such as the light waves corresponding to the incident beams 56, 60, thereby rotating the polarization state of those light waves from p-polarization to s-polarization, while preserving the polarization state for s-polarized light in certain wavelengths, such as the light waves corresponding to the incident beams 64. As a result, all of the light waves, from the incident beams 56, 60, 64, at the output of the chromatic retarder 52 are in the same polarization state (s-polarized).

In a non-limiting example, the chromatic retarder 52 is implemented as several orders of $1\lambda_3$ wave plates, where $\lambda_3$ is the wavelength of the light that is produced by the third source of polarized light. As previously discussed, in a particularly preferred implementation, the first source of polarized light is configured to produce polarized green light centered at wavelength ($\lambda_1$) of 638 nanometers nm—or approximately 638 nm, the second source of polarized light is configured to produce polarized blue light centered at wavelength ($\lambda_2$) of 456 nm—or approximately 456 nm, and the third source of polarized light is configured to produce polarized green light centered at wavelength ($\lambda_3$) of 532 nm—or approximately 532 nm.

Figure 9:
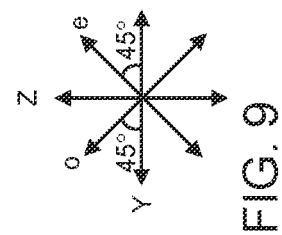
Figure 6:
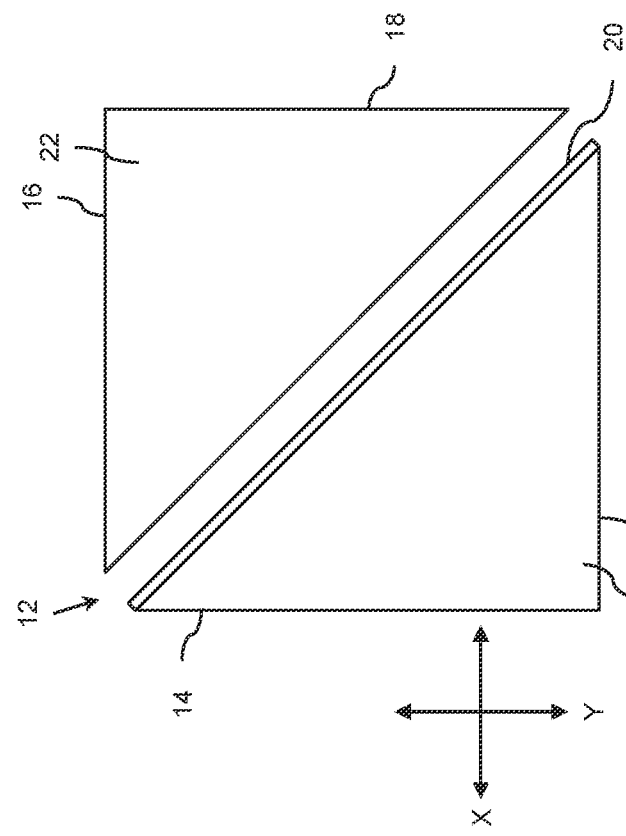

The chromatic retarder 52 has a difference between the ordinary axis (o-axis) and the extraordinary axis (e-axis) that is equal to $N*\lambda_3$ (for certain integer values of N, discussed further below). Placement of the chromatic retarder 52 at a prescribed angle of 45-degrees between the o and e polarizations ensures the proper requisite retardance in wavelength for the three colors of light. In the arbitrarily labeled XYZ coordinate system used in the drawings, the chromatic retarder 52 is deployed with an axial offset in which the o-axis and the e-axis are 45-degrees from the y-axis (and z-axis), as shown in FIG. 9.

The chromatic retarder 52 can be implemented as any non-dispersive birefringent element that provides the requisite retardance in wavelength. For example, any non-dispersive birefringent element with retardance $N*\lambda_3$, where $N=6*(n+0.5)$ for non-negative integer values of n, can be used to form the chromatic retarder 52.

Table 1 below shows the retardance in wavelength for cases where n=0, 1 and 2 and where $\lambda_1=638.4$ nm, $\mu_2=456$ nm, and $\lambda_3=532$ nm.

TABLE 1

| | Retardance in wavelength | | |
|---|---|---|---|
| n | Retardance for $\lambda_1$ | Retardance for $\lambda_2$ | Retardance for $\lambda_3$ |
| 0 | $2.5 * \lambda_1 = 3* \lambda_3$ | $3.5* \lambda_2 = 3* \lambda_3$ | $3* \lambda_3$ |
| 1 | $7.5* \lambda_1 = 9* \lambda_3$ | $10.5* \lambda_2 = 9* \lambda_3$ | $9* \lambda_3$ |
| 2 | $12.5* \lambda_1 = 15* \lambda_3$ | $17.5* \lambda_2 = 15* \lambda_3$ | $15* \lambda_3$ |

As can be seen from Table 1, the retardance for $\mu_1$ and $\lambda_2$ are odd-integer multiples of half wavelengths, whereas the retardance for where $\lambda_3$ is an even-integer multiple of half wavelengths. Thus, the retardance provided by the chromatic retarder 52 acts as a half wave plate for $\mu_1$ and $_2$, thereby changing the polarization for $\lambda_1$ and $\lambda_2$ from p-polarization to s-polarization while preserving the polarization state for $\lambda_3$.

As alluded to above, the traversal of light through the prism assembly 70 to produce the desired color-combined (i.e., mixed color) light waves effect is in part a result of the properties of the dichroic coating that form the DBS 20 and the DBS 40. The following paragraphs discuss the design considerations for these dichroic coatings. As should be apparent, the requisite reflection and transmission characteristics of the DBS 20 and the DBS 40 are directly tied to the ordering of colored light that is injected into the prism assembly 70 by the sources of the polarized light, and the polarization state of that injected light. To this end, the following dichroic coating discussion is made in reference to the preferred implementation of the optical device 10 shown in FIGS. 1-7, in which the first source of polarized light produces s-polarized red light, the second source of polarized light produces s-polarized blue light, and the third source of polarized light produces s-polarized green light. The dichroic coatings are preferably designed with low absorption materials, so if the reflectance is high, the transmittance is low, and vice versa.

Bearing the above in mind, the prism assembly 70 is designed such that the dichroic coating that forms the DBS 20 has low reflectance and high transmittance for s-polarized red light (i.e., low $R_S$, high $T_S$), and has high reflectance blue light (i.e., high $R_S$, high $T_S$), and such that the dichroic coating that forms the DBS 40 has low reflectance and high transmittance for p-polarized red and blue light (i.e., low $R_P$, high $T_P$), and has high reflectance and low transmittance for s-polarized green light (i.e., high $R_S$, high $T_S$). As a result, red light, produced by the first source of polarized light, is transmitted by the DBS 20 and the DBS 40, blue light, produced by the second source of polarized light, is reflected by the DBS 20 and is transmitted by the DBS 40, and green light, produced by the third source of polarized light, is reflected by the DBS 20.

The following paragraphs describe different design options for the dichroic coatings of the DBS 20 and the DBS 40, with reference to various reflectance curves for both s and p polarizations, and also illustrates the rationale behind rotationally offsetting the DBS 20 from the DBS 40 in order to provide the color combining functionality. The reflectance curves show the reflectance behavior of light that is incident to the DBS's of the prisms 12, 32 in a non-limiting construction in which the prisms 12, 32 are constructed from a material having a refractive index of 1.7. Therefore, the incident angles under consideration in the following paragraphs are in the range of 30-60 degrees. For completeness, a widened range of incident angles in a range of 0-60 degrees is shown in the reflectance curves. As previously discussed, the incident angles are measured relative to the normal to the surface of the DBS encountered by the beam.

Figure 10:
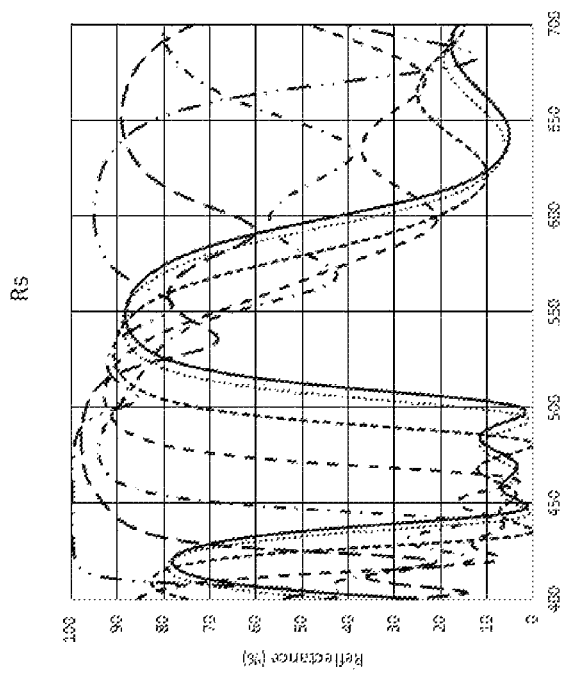

FIG. 10 shows reflectance curves as a function of wavelength for s-polarization of a possible designed dichroic coating for the DBS 40 for s-polarization for various angles of incidence, measured with respect to the surface of the DBS 40. As shown, although s-polarized green light has high reflectance for all angles in the incident angle range of 0-60 degrees, s-polarized red and blue light also have high reflectance for certain incident angles, in particular, incident angles greater than 30-degrees. As a result, using this designed dichroic coating for the DBS 40 without properly rotationally offsetting the DBS 20 from the DBS 40 would result in red and blue light being reflected by the DBS 40 for angles of incidence greater than 30-degrees. Therefore, for particularly important sub-ranges (e.g., 30-60 degrees) of the 0-60-degree incident angle range, red and blue light would be reflected by the DBS 40, such that any residual red and blue light transmitted by the DBS 40 and combined with the green light will have suffered a significant loss in intensity.

FIG. 11 shows reflectance curves as a function of wavelength for p-polarization of a possible designed dichroic coating for the DBS 40 for p-polarization for the 0-60-degree incident angle range discussed with respect to FIG. 10. As can be seen, p-polarized red and blue light have low reflectance for all angles in the incident angle range of 0-60 degrees. As a result, using this designed dichroic coating for the DBS 40 while properly rotationally offsetting the DBS 20 from the DBS 40 would result in red and blue light being transmitted by the DBS 40 for all angles in the incident angle range of 0-60 degrees. Therefore, this designed dichroic coating for the DBS 40 is conducive to providing the desired wide beam color-combining functionality, since the p-polarized red and blue light will be transmitted by the DBS 40 for all incident angles in the 0-60-degree range.

FIG. 12 shows reflectance curves as a function of incident angle for the designed dichroic coating discussed with respect to FIG. 11, at three particular sets of polarization-wavelength: p-polarized light at wavelength 456 nm (blue light), s-polarized light at wavelength 532 nm (green light), and p-polarized light at wavelength 638 nm (red light). As can be seen, the reflectance for the p-polarized light (i.e., 456 nm and 638 nm) is relatively low (below approximately 15%) across nearly the entirety of the 0-60-degree range, with the exception of the 638 nm light eclipsing 15% in a range of approximately 24-30 degrees, with a peak reflectance of approximately 16% at around 28-degrees. In addition, the reflectance for the s-polarized light (i.e., 532 nm) relatively high (above approximately 77%) across nearly the entirety of the 0-60-degree range, with the exception of dropping below approximately 77% between 47-53 degrees, and with a minimum reflectance of approximately 70% at around 50-degrees.

FIG. 13 shows reflectance curves as a function of wavelength for s-polarization of a possible designed dichroic coating for the DBS 20 for s-polarization for various angles of incidence between 0-60-degrees, measured with respect to the surface of the DBS 20. As can be seen, s-polarized red light has low reflectance for all angles in the incident angle range of 0-60 degrees, whereas s-polarized blue light has high reflectance for all angles in the incident angle range of 0-60 degrees. As a result, using this designed dichroic coating for the DBS 20 would result in red light being transmitted by the DBS 20 and blue light being reflected by the DBS 20, for all angles in the incident angle range of 0-60 degrees.

FIG. 14 shows reflectance curves (for s-polarized light) as a function of incident angle for the designed dichroic coating discussed with reference to FIG. 13, at two particular wavelengths: 456 nm (blue light) and 638 nm (red light). As can be seen, the reflectance for the 638 nm light remains low (below approximately 7%) across the entire 0-60-degree range, and the reflectance for the 456 nm light remains high (above approximately 93%) across nearly the entirety of the 0-60-degree range.

As should be apparent from the foregoing description of the optical device 10, either or both of the DBS 20 and the DBS 40 may be rotated about one or more primary axes while still maintaining the color-combining functionality, so long as orientation between the DBS 20 and the DBS 40 is maintained such that light in a first polarization state (s-polarized or p-polarized) relative to the surface of the DBS 20 is in a second polarization state (p-polarized or s-polarized) relative to the surface of the DBS 40.

For example, the DBS 20 may be rotated by 90-degrees about the z-axis, and/or the DBS 40 may be rotated by 90-degrees about the y-axis. Such rotations would inherently change the light-wave entrance surfaces of the prisms 12, 32. For example, the surface 26 would become the second light-wave entrance surface of the prism 12 after 90-degree rotation of the DBS 20 about the z-axis, the surface 46 would become the first light-wave entrance surface of the prism 32 after 90-degree rotation of the DBS 40 about the y-axis.

It should be appreciated that other rotations of either or both of the DBS 20 and the DBS 40 about one or more primary axes (and equivalently either or both of the prisms 12, 32), with appropriately corresponding changes to the light-wave entrance surfaces, are contemplated herein, and should be apparent to those skilled in the art in view of the forgoing disclosure.

It is noted that the preferred implementation in which the first source of polarized light produces polarized red light, the second source of polarized light produces polarized blue light, and the third source of polarized light produces polarized green light provides several advantages in the design of the optical device 10. One such advantage is the design of the chromatic retarder 52 since the particular wavelengths of interest do not lend themselves to finding good solutions for the requisite retardance in wavelength. Another advantage is that the preferred implementation lends itself to higher efficiency of green light that is propagated through the prism assembly 70. Light sources that produce green light are typically less efficient than light sources that produce blue or red light. This is particularly true when those light sources are implemented as LEDs. Therefore, it is preferable to reduce the energy loss of the green light as it traverses the prism assembly 70 as much as possible. As illustrated above, in the preferred implementation, the green light only traverses the prism 32, and does not enter the prism 12. Therefore, the green light is propagated through the prism assembly 70 with less energy loss when compared to the red and blue light (which must traverse both prisms 12, 32).

Although the operation of the optical device 10, as described thus far, has pertained to a preferred implementation in which the sources of polarized light are ordered, from left to right in FIG. 1, as red (R), blue (B), green (G), i.e., the first source of polarized light produces s-polarized red light, the second source of polarized light produces s-polarized blue light, and the third source of polarized light produces s-polarized green light, all possible orderings of the sources of polarized light are contemplated herein and fall within the scope of the present invention.

The following paragraphs describe two light source orderings according to additional implementations of the optical device 10. In a first additional implementation, the first source of polarized light produces s-polarized red light, the second source of polarized light produces s-polarized green light, and the third source of polarized light produces s-polarized blue light. FIG. 15 shows reflectance curves as a function of wavelength for s-polarization of a possible designed dichroic coating for the DBS 40 for s-polarization for various angles of incidence, measured relative to the surface of the DBS 40. As shown, although s-polarized blue light has high reflectance for all angles in the incident angle range of 0-60 degrees (especially for wavelengths in the range of 420-450 nm), s-polarized green and red light also have high reflectance for certain incident angles, in particular, incident angles greater than 30-degrees. As a result, using this designed dichroic coating for the DBS 40 without properly rotationally offsetting the DBS 20 from the DBS 40 would result in red and green light being reflected by the DBS 40 for angles of incidence greater than 30-degrees and 20-degrees, respectively. Therefore, for particular sub-ranges (e.g., 20/30-60 degrees) of the 0-60-degree incident angle range, red and green light would be reflected by the DBS 40, such that any residual red and green light transmitted by the DBS 40 and combined with the blue light will have suffered a significant loss in intensity.

FIG. 16 shows reflectance curves as a function of wavelength for p-polarization of a possible designed dichroic coating for the DBS 40 for p-polarization for the 0-60-degree incident angle range. As can be seen, p-polarized red and green light have low reflectance for all angles in the incident angle range of 0-60 degrees. As a result, using this designed dichroic coating for the DBS 40 while properly rotationally offsetting the DBS 20 from the DBS 40 would result in red and green light being transmitted by the DBS 40 for all angles in the incident angle range of 0-60 degrees. Therefore, this designed dichroic coating for the DBS 40 is conducive to providing the desired wide beam color-combining functionality, since the p-polarized red and green light will be transmitted by the DBS 40 for all incident angles in the 0-60-degree range.

Design of dichroic coatings such that the DBS 20 transmits s-polarized red light and reflects s-polarized green light will not be discussed herein in detail. The design of such dichroic coatings to effect reflection and transmission for s-polarized red and green light, respectively, should be apparent to those of ordinary skill in the art based on the previous discussion of dichroic coatings herein.

In a second additional implementation, the first source of polarized light produces s-polarized green light, the second source of polarized light produces s-polarized blue light, and the third source of polarized light produces s-polarized red light. FIG. 17 shows reflectance curves as a function of wavelength for s-polarization of a possible designed dichroic coating for the DBS 40 for s-polarization for various angles of incidence, measured relative to the surface of the DBS 40. As shown, although s-polarized red light has high reflectance for all angles in the incident angle range of 0-60 degrees (especially for wavelengths in the range of 625-660 nm), s-polarized blue and green light also have high reflectance for certain incident angles, in particular, incident angles greater than 30-degrees. As a result, using this designed dichroic coating for the DBS 40 without properly rotationally offsetting the DBS 20 from the DBS 40 would result in blue and green light being reflected by the DBS 40 for angles of incidence greater than 30-degrees. Therefore, for particularly important sub-ranges (e.g., 30-60 degrees) of the 0-60-degree incident angle range, blue and green light would be reflected by the DBS 40, such that any residual blue and green light transmitted by the DBS 40 and combined with the red light will have suffered a significant loss in intensity.

FIG. 18 shows reflectance curves as a function of wavelength for p-polarization of a possible designed dichroic coating for the DBS 40 for p-polarization for the 0-60-degree incident angle range. As can be seen, p-polarized blue and green light have low reflectance for all angles in the incident angle range of 0-60 degrees. As a result, using this designed dichroic coating for the DBS 40 while properly rotationally offsetting the DBS 20 from the DBS 40 would result in blue and green light being transmitted by the DBS 40 for all angles in the incident angle range of 0-60 degrees. Therefore, this designed dichroic coating for the DBS 40 is conducive to providing the desired wide beam color-combining functionality, since the p-polarized blue and green light will be transmitted by the DBS 40 for all incident angles in the 0-60-degree range.

Design of dichroic coatings such that the DBS 20 transmits s-polarized green light and reflects s-polarized blue light will not be discussed herein in detail. The design of such dichroic coatings to effect reflection and transmission for s-polarized green and blue light, respectively, should be apparent to those of ordinary skill in the art based on the previous discussion of dichroic coatings herein.

The optical device 10 described thus far can be used in a wide range of applications for which a miniature color-combiner is needed. Examples of suitable applications include, but are not limited to, various imaging applications, such as near eye displays (NEDs), head mounted displays (HMDs), and head-up displays (HUDs) that utilize image projectors that project images into components of the NED, HMD, and HUD, cellular phones, compact displays, 3-D displays, compact beam expanders, as well as non-imaging applications, such as flat-panel indicators and scanners. The optical device 10 of the present embodiments may be of particular value when used as an illumination component of such image projectors, which employ SLM micro-displays that require illumination by polarized light to generate image pixels. Various types of image projectors suitable for NED, HMD, and HUD applications, are commercially available from Lumus Ltd. (Israel). These image projectors may employ various prism assemblies, including, illumination prisms and collimating prisms, together with a reflective-display device (e.g. LCoS).

By way of illustration of one particularly preferred but non-limiting subset of applications, FIG. 19 illustrates an optical device 100 corresponding to the structure described with respect to FIGS. 1-7, combined with an image projector device 110 that generates a collimated image, and a light-guiding substrate 124 that receives injected images from the image projector device 110, to form an optical system. The generic structure of the image projector device 110 and the substrate 124 will now be described, however, more detailed description of the image projector device 110 and the substrate 124 may be found in the following PCT patent publications, the disclosures of which are incorporated by reference in their entirety herein: WO 2018/100582, WO 01/95027, and WO 2008/023367. It is noted that the image projector device 110 and the substrate 124 described herein are merely examples of image projecting devices and light-guiding optical elements with which the optical device 100 can be used to advantage.

The image projector device 110 includes two constituent prisms 112, 114 that form an image-collimating prism. A polarization selective beamsplitter configuration 118 (PBS 118) is deployed within the image-collimating prism. Light waves 122, output from the optical device 100, enter the prism 112, preferably as s-polarized light waves. The s-polarized light waves are reflected by the PBS 118 toward an image display surface where they impinge on a reflective-display device 120 (preferably implemented as an LCoS). Pixels corresponding to bright regions of the image are reflected with modulated rotated polarization to transform the light waves from s-polarized to p-polarized so that radiation from the bright pixels is transmitted through the PBS 118 and passes through at least one retardation plate (not shown), preferably a quarter-wave plate, before entering at least one light-wave collimating component 116 overlying at least part of the retardation plate, and is reflected back through quarter-wave plate to transform the light waves back to s-polarized. The s-polarized light waves are then reflected by the PBS 118 out of the prism 114, where they enter the substrate 124.

The substrate 124 typically includes at least two major surfaces 126 and 128 that are parallel to each other, one or more partially reflecting surfaces 132, and an optical wedge element 130 for coupling light into the substrate 124. The output light-waves 122 from the image projector device 110 enter the substrate 124 through the optical wedge element 130. The incoming light-waves (vis-a-vis the substrate 124) are trapped in the substrate 124 by total internal reflection (TIR) as illustrated in FIG. 19. The outcoupling of the trapped light waves from the substrate 124 can be applied by the partially reflecting surfaces 132 or by diffractive elements, or any other suitable outcoupling arrangement. The optical wedge element 130 is merely illustrative of one non-limiting optical coupling configuration, and other elements and configurations can be used to couple the light from the image projector device 110 into substrate 124.

Throughout this document, reference has been made to light preferably centered at wavelength in a particular wavelength range. Such light can generally be referred to as "colored light" that has wavelength that is in a particular spectral region of the visible spectrum, preferably at the center of that particular spectral region. Although the embodiments of the present disclosure have been described within the context of blue light centered at wavelength of 456 nm—or approximately 456 nm, green light centered at wavelength of 532 nm—or approximately 532 nm, and red light centered at wavelength of 638 nm—or approximately 638 nm, these specific wavelengths are exemplary only, and the particular wavelength of the different types of colored light can be selected from anywhere in the relevant spectral region of the visible spectrum, which in the case of blue light is approximately in a range of 450 nm-485 nm (but can extend outside of this range in certain instances), and in the case of green light is approximately in a range of 500 nm-565 nm (but can extend outside of this range in certain instances), and in the case of red light is approximately in a range of 625 nm-740 nm (but can extend outside of this range in certain instances).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical device comprising:
   a first prism including:
      a first light-wave entrance surface, a second light-wave entrance surface, and a light-wave exit surface, and
      a first dichroic beamsplitter configuration deployed within the first prism on a plane oblique to at least one of the light-wave entrance surfaces; and
   a second prism including:
      a first light-wave entrance surface, and a second light-wave entrance surface associated with the light-wave exit surface of the first prism, and
      a second dichroic beamsplitter configuration deployed within the second prism on a plane oblique to at least one of the light-wave entrance surfaces of the second prism and such that light in a first polarization state with regards to the first dichroic beamsplitter configuration is in a second polarization state with regards to the second dichroic beamsplitter configuration,
   the first dichroic beamsplitter configuration transmitting light at a wavelength of a first color, polarized in the first polarization state with regards to the first dichroic beamsplitter configuration, and reflecting light at a wavelength of a second color, polarized in the first polarization state with regards to the first dichroic beamsplitter configuration, and
   the second dichroic beamsplitter configuration transmitting light at a wavelength of the first color and light at a wavelength of second color, polarized in the second polarization state with regards to the second dichroic beamsplitter configuration, and reflecting light at a wavelength of a third color, polarized in the first polarization state with regards to the second dichroic beamsplitter configuration.

2. The optical device of claim 1, further comprising:
   a first source of polarized light associated with the first light-wave entrance surface of the first prism that produces light of the first color in the first polarization state with regards to the first dichroic beamsplitter configuration;
   a second source of polarized light associated with the second light-wave entrance surface of the first prism that produces light of the second color in the first polarization state with regards to the first dichroic beamsplitter configuration; and
   a third source of polarized light associated with the first light-wave entrance surface of the second prism that produces light of the third color in the first polarization state with regards to the second dichroic beamsplitter configuration.

3. The optical device of claim 2, wherein light produced by the first and second sources of polarized light reaches a light-wave exit surface of the second prism in the second polarization state with regards to the second dichroic beamsplitter configuration, and light produced by the third source of polarized light reaches the light-wave exit surface of the second prism in the first polarization state with regards to the second dichroic beamsplitter configuration.

4. The optical device of claim 2, wherein light produced by the first and second sources of polarized light, and light produced by the third source of polarized light, enter the first and second prisms, respectively, as uncollimated light.

5. The optical device of claim 2, wherein the first source of polarized light is configured to produce red light that is s-polarized with regards to the first dichroic beamsplitter configuration, and wherein the second source of polarized light is configured to produce blue light that is s-polarized with regards to the first dichroic beamsplitter configuration, and wherein the third source of polarized light is configured to produce green light that is s-polarized with regards to the second dichroic beamsplitter configuration.

6. The optical device of claim 2, wherein the first source of polarized light is configured to produce red light that is s-polarized with regards to the first dichroic beamsplitter configuration, and wherein the second source of polarized light is configured to produce green light that is s-polarized with regards to the first dichroic beamsplitter configuration, and wherein the third source of polarized light is configured to produce blue light that is s-polarized with regards to the second dichroic beamsplitter configuration.

7. The optical device of claim 2, wherein the first source of polarized light is configured to produce green light that is s-polarized with regards to the first dichroic beamsplitter configuration, and wherein the second source of polarized light is configured to produce blue light that is s-polarized with regards to the first dichroic beamsplitter configuration, and wherein the third source of polarized light is configured to produce red light that is s-polarized with regards to the second dichroic beamsplitter configuration.

8. The optical device of claim 2, wherein the sources of polarized light include light-emitting diodes.

9. The optical device of claim 2, wherein the sources of polarized light include lasers.

10. The optical device of claim 2, further comprising:
a chromatic retarder associated with a light-wave exit surface of the second prism, the chromatic retarder oriented so as to change a polarization state of light from the first and second sources of polarized light from the second polarization state to the first polarization state with regards to the second dichroic beamsplitter configuration.

11. The optical device of claim 1, further comprising:
a reflective-display device that produces polarized light in response to being illuminated by light output from a light-wave exit surface of the second prism.

12. The optical device of claim 11, further comprising:
a light-guiding substrate having at least two major surfaces parallel to each other, wherein light produced by the reflective display device is coupled into the light-guiding substrate.

13. The optical device of claim 11, wherein the reflective-display device includes a liquid-crystal-on-silicon display.

14. The optical device of claim 1, wherein the first polarization state with regards to the first dichroic beamsplitter configuration is s-polarization.

15. The optical device of claim 1, wherein the first and second prisms are optically coupled to each other at the light-wave exit surface of the first prism and the second light-wave entrance surface of the second prism.

16. An optical device comprising:
a first prism including:
first and second light-wave entrance surfaces, and
a first dichroic beamsplitter configuration deployed within the first prism on a plane oblique to at least one of the light-wave entrance surfaces;
a second prism including:
a light-wave entrance surface, and
a second dichroic beamsplitter configuration deployed within the second prism on a plane oblique to the first light-wave entrance surface of the second prism and such that light in a first polarization state with regards to the first dichroic beamsplitter configuration is in a second polarization state with regards to the second dichroic beamsplitter configuration,
a first source of polarized light, associated with the first light-wave entrance surface of the first prism, that produces light of a first color in a first polarization state with regards to the first dichroic beamsplitter configuration;
a second source of polarized light, associated with the second light-wave entrance surface of the first prism, that produces light of a second color in the first polarization state with regards to the first dichroic beamsplitter configuration;
a third source of polarized light, associated with the first light-wave entrance surface of the second prism, that produces light of a third color in the first polarization state with regards to the second dichroic beamsplitter configuration,
wherein light produced by the first source of polarized light is transmitted by the first dichroic beamsplitter configuration and transmitted by the second dichroic beamsplitter configuration, and wherein light produced by the second source of polarized light is reflected by the first dichroic beamsplitter configuration and transmitted by the second dichroic beamsplitter configuration, and wherein light produced by the third source of polarized light is reflected by the second dichroic beamsplitter configuration.

17. The optical device of claim 16, wherein light produced by the first and second sources of polarized light, and light produced by the third source of polarized light, enter the first and second prisms, respectively, as uncollimated light.

18. An optical device comprising:
a prism assembly including:
a first external surface, a second external surface, and a third external surface, wherein the first, second and third external surfaces are mutually orthogonal, and wherein a first light-wave entrance surface is formed on at least a portion of the first external surface, a second light-wave entrance surface is formed on at least a portion of the second external surface, and a third light-wave entrance surface is formed on at least a portion of the third external surface, and
a first dichroic beamsplitter configuration deployed within a first portion of the prism assembly on a plane oblique to at least one of the first or second light-wave entrance surfaces,
a second dichroic beamsplitter configuration deployed within a second portion of the prism assembly on a plane oblique to the third light-wave entrance surface such that light in a first polarization state with regards to the first dichroic beamsplitter configuration is in a second polarization state with regards to the second dichroic beamsplitter configuration;

a first source of polarized light, associated with the first light-wave entrance surface, that produces light of a first color in a first polarization state with regards to the first dichroic beamsplitter configuration;

a second source of polarized light, associated with the second light-wave entrance surface, that produces light of a second color in the first polarization state with regards to the first dichroic beamsplitter configuration; and a third source of polarized light, associated with the third light-wave entrance surface, that produces light of a third color in the first polarization state with regards to the first dichroic beamsplitter configuration, wherein the first dichroic beamsplitter configuration is configured to transmit light, at a wavelength of the first color, that is polarized in the first polarization state with regards to the first dichroic beamsplitter configuration, and reflect light, at a wavelength of the second color, that is polarized in the first polarization state with regards to the first dichroic beamsplitter configuration, and wherein the second dichroic beamsplitter configuration is configured to transmit light, at a wavelength of the first or second color, that is polarized in the second polarization state with regards to the second dichroic beamsplitter configuration, and reflect light, at a wavelength of the third color, that is polarized in the first polarization state with regards to the second dichroic beamsplitter configuration.

19. The optical device of claim 18, wherein light produced by the first, second and third sources of polarized light enters the prism assembly as uncollimated light.

* * * * *